United States Patent
Mohseni

(10) Patent No.: US 10,254,407 B2
(45) Date of Patent: Apr. 9, 2019

(54) ELECTROABSORPTION MODULATOR FOR DEPTH IMAGING AND OTHER APPLICATIONS

(71) Applicant: Northwestern University, Evanston, IL (US)

(72) Inventor: Hooman Mohseni, Wilmette, IL (US)

(73) Assignee: Northwestern University, Evanston, IL (US)

( * ) Notice: Subject to any disclaimer, the term of this patent is extended or adjusted under 35 U.S.C. 154(b) by 409 days.

(21) Appl. No.: 15/057,792

(22) Filed: Mar. 1, 2016

(65) Prior Publication Data

US 2016/0259059 A1 Sep. 8, 2016

Related U.S. Application Data

(60) Provisional application No. 62/126,802, filed on Mar. 2, 2015, provisional application No. 62/131,603, filed
(Continued)

(51) Int. Cl.
*G01C 3/08* (2006.01)
*G01S 17/89* (2006.01)
(Continued)

(52) U.S. Cl.
CPC ............ *G01S 17/89* (2013.01); *G01S 7/4816* (2013.01); *G01S 17/36* (2013.01); *G02F 1/015* (2013.01);
(Continued)

(58) Field of Classification Search
CPC ........ G01S 17/89; G01S 7/4816; G01S 17/36; G02F 1/015; G02F 1/017; G02F 1/01725;
(Continued)

(56) References Cited

U.S. PATENT DOCUMENTS 5,300,788 A 4/1994 Fan
5,345,093 A 9/1994 Mathur
(Continued)

OTHER PUBLICATIONS

H. Mohseni, Tunable Surface-Normal Modulators Operating Near 1550 nm With a High-Extinction Ratio at High Temperatures, IEEE Photonics Technology Letters, vol. 18, No. 1, Jan. 1, 2006, pp. 214-216.
(Continued)

*Primary Examiner* — Samantha K Abraham
(74) *Attorney, Agent, or Firm* — Bell & Manning, LLC

(57) ABSTRACT

A TOF depth imaging system for providing a depth image of an object is provided comprising a light source configured to illuminate an object with amplitude modulated light characterized by a wavelength $\lambda$ and a modulation frequency f, a surface-normal electroabsorption modulator configured to receive and to modulate reflected light from the object with the modulation frequency f, and an image sensor configured to receive and to detect modulated reflected light from the electroabsorption modulator. The electroabsorption modulator comprises a top doped layer of semiconductor, a bottom doped layer of semiconductor having opposite polarity to the top doped layer, and an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior.

24 Claims, 24 Drawing Sheets

Related U.S. Application Data on Mar. 11, 2015, provisional application No. 62/235,962, filed on Oct. 1, 2015.

(51) Int. Cl.
| | | |
|---|---|---|
| G02F 1/017 | (2006.01) | |
| G01S 17/36 | (2006.01) | |
| G01S 7/481 | (2006.01) | |
| G02F 1/015 | (2006.01) | |

(52) U.S. Cl.
CPC .......... *G02F 1/017* (2013.01); *G02F 1/01725* (2013.01); *G02F 2001/0155* (2013.01); *G02F 2001/0157* (2013.01); *G02F 2001/0175* (2013.01)

(58) Field of Classification Search
CPC ..... G02F 2001/0155; G02F 2001/0157; G02F 2001/0175
See application file for complete search history.

(56) References Cited

U.S. PATENT DOCUMENTS

| | | | |
|---|---|---|---|
| 5,510,627 | A | 4/1996 | Snow |
| 5,588,015 | A | 12/1996 | Yang |
| 5,589,876 | A | 12/1996 | Konuma |
| 5,594,750 | A | 1/1997 | Zhang |
| 5,799,026 | A | 8/1998 | Meyer et al. |
| 5,818,066 | A | 10/1998 | Duboz |
| 6,028,323 | A | 2/2000 | Liu |
| 6,091,905 | A | 7/2000 | Yahav et al. |
| 6,956,232 | B2 | 10/2005 | Reynolds |
| 7,064,881 | B2 | 6/2006 | Mohseni |
| 7,095,542 | B2 | 8/2006 | Yu |
| 7,282,777 | B1 | 10/2007 | Chuang |
| 7,442,953 | B2 | 10/2008 | Augusto |
| 7,804,640 | B1 | 9/2010 | Bass |
| 7,932,496 | B2 | 4/2011 | Kato |
| 8,487,259 | B2 | 7/2013 | Cho |
| 9,054,247 | B2 | 6/2015 | Mohseni |
| 2002/0008191 | A1 | 1/2002 | Faska |
| 2002/0074542 | A1 | 6/2002 | Gunapala |
| 2002/0131463 | A1 | 9/2002 | Bruno |
| 2004/0108500 | A1 | 6/2004 | Yoshikawa |
| 2004/0149981 | A1 | 8/2004 | Reynolds |
| 2005/0082520 | A1 | 4/2005 | Fathimulla |
| 2006/0175550 | A1 | 8/2006 | Siddiqi |
| 2007/0019274 | A1 | 1/2007 | Lerner |
| 2007/0085114 | A1 | 4/2007 | De Rossi |
| 2007/0112259 | A1 | 5/2007 | Tateda et al. |
| 2007/0153857 | A1 | 7/2007 | Chua |
| 2007/0158638 | A1 | 7/2007 | Perera |
| 2007/0184575 | A1 | 8/2007 | Liu |
| 2007/0237442 | A1 | 10/2007 | Marks |
| 2008/0267231 | A1 | 10/2008 | Oktyabrsky |
| 2009/0034904 | A1 | 2/2009 | Tsuzuki |
| 2009/0140144 | A1 | 6/2009 | Myrick |
| 2010/0032652 | A1 | 2/2010 | Okamura |
| 2010/0038541 | A1 | 2/2010 | Clark |
| 2010/0123120 | A1 | 5/2010 | Mohseni |
| 2011/0024721 | A1 | 2/2011 | Edamura et al. |
| 2011/0156056 | A1 | 6/2011 | Krames |
| 2011/0216105 | A1 | 9/2011 | Kamijima |
| 2012/0075834 | A1 | 3/2012 | Wei |
| 2012/0207401 | A1 | 8/2012 | Archer |
| 2013/0008503 | A1 | 1/2013 | McGrath |
| 2013/0082286 | A1 | 4/2013 | Finkelstein |
| 2013/0215496 | A1 | 8/2013 | Ban |
| 2013/0270418 | A1 | 10/2013 | Cho |
| 2014/0009905 | A1 | 1/2014 | Kobayashi et al. |
| 2015/0054925 | A1 | 2/2015 | Park |
| 2015/0287870 | A1 | 10/2015 | Mohseni |

OTHER PUBLICATIONS

H. Mohseni, et al., High-Performance Surface-normal Modulators Based on Stepped Quantum Wells, Proc. of SPIE vol. 5814, 2005, pp. 191-198.

H. Mohseni, et al., Highly Linear and Efficient Phase Modulators based on GaInAsP—InP Three-Step Quantum Wells, Applied Physics Letters 86, 031103, Jan. 10, 2005, pp. 031103-1-031103-3.

H. Mohseni, et al., High performance type-II InAs/GaSb superlattice photodiodes, Proceedings of SPIE, vol. 4288, 2001, pp. 191-199.

H. Mohseni, et al., A Novel Nano-Injector Based Single Photon Infrared Detector, Enabling Photonics Technologies for Defense, Security, and Aerospace Apps. II, Proc. of SPIE vol. 6243, Apr. 17, 2006, pp. 62430X-1-62430X-6.

H. Mohseni, et al., A Novel Avalanche Free Single Photon Detector, Department of Electrical Engineering and Computer Science, Northwestern University, Evanston, IL, 2006, IEEE, pp. 163-165.

International Searching Authority, International Search Report and Written Opinion issued in PCT/US2016/020256, dated May 11, 2016, 10 pages.

Yong-Hwa Park, et al., Three-dimensional imaging using fast micromachined electro-absorptive shutter, J. Micro/Nanolith. MEMS MOEMS 12(2), 023011, Jun. 6, 2013, pp. 023011-1-023011-11.

Sidhu, et al., A long-wavelength photodiode on InP using lattice-matched GaInAs—GaAsSb type-II quantum wells, IEEE Photonics Technology Letters, vol. 17, No. 12, Dec. 2005, pp. 2715-2717.

Memis, et al., Sub-Poissonian shot noise of a high internal gain injection photon detector, Optics Express, vol. 16, No. 17, Aug. 7, 2008, pp. 12701-12706.

Memis, et al., A photon detector with very high gain at low bias and at room temperature, Applied Physics Letters, vol. 91, No. 171112, Oct. 25, 2007, pp. 1-3.

Memis, et al., Detailed Numerical Modeling of a Novel Infrared Single Photon Detector for $\lambda > 1$ μm, 7th International Conference on Numerical Simulation of Optoelectronic Devices, 2007, pp. 63-64.

Memis, et al., Low Noise, High Gain Short-Wave Infrared Nano-Injection Photon Detectors with Low Jitter, IEEE Lasers and Electro-Optics Society, 21st Annual Meeting, 2008, pp. 159.

Memis, et al., New Generation of Isolated Nano-injection Detectors and Imagers, EECS Department, Northwestern University, Evanston, IL, 2011, pp. 1-3.

Memis, et al., A Short-Wave Nanoinjection Infrared Imager with 2500 A/W Responsivity and Low Excess Noise, IEEE Photonics Journal, vol. 2, No. 5, Oct. 2010, pp. 858-864.

Memis, et al., Signal-to-noise performance of a short-wave infrared nanoinjection imager, Optics Letters, vol. 35, No. 16, Aug. 15, 2010, pp. 2699-2701.

Memis, et al., Short-Wave Infrared Nano-Injection Imaging Sensors, IEEE Sensors 2010 Conference, 2010, pp. 128-131.

Memis, et al., Resonant Tunneling Injection Detectors and Imagers, Department of Electrical Engineering and Computer Science, Northwestern University, Evanston, IL, 2009, pp. 363-364.

Memis, et al., On the Source of Jitter in a Room-Temperature Nanoinjection Photon Detector at 1.55 μm, IEEE Electron Device Letters, vol. 29, No. 8, Aug. 2008, pp. 867-869.

Memis, et al., A Bio-inspired Single Photon Detector with Suppressed Noise and Low Jitter, Proc. of SPIE, vol. 7035, Aug. 29, 2008, pp. 70350V-1-70350V-12.

Memis, et al., A Type-II Near-Infrared Detector with Very High Stable Gain and Low Noise at Room Temperature, ISDRS 2007, College Park, MD, Dec. 12, 2007.

Memis, et al., A Novel Avalanche Free Single Photon Detector, Department of Electrical Engineering and Computer Science, Northwestern University, Evanston, IL, 2006, pp. 742-745.

Memis, et al., A Novel Type-II Infrared Single Photon Detector, Northwestern University, Department of Electrical Engineering and Computer Science, 2006, pp. 29-30.

Extended European search report mailed in European Application No. 16759354.0, dated Sep. 11, 2018.

Na et al., Low voltage operation of electro-absorption modulator promising for high-definition 3D imaging application using a three

(56) References Cited

OTHER PUBLICATIONS step asymmetric coupled quantum well structure, Journal of Physics: Conference Series 574, (2015).

Woodward et al., Comparison of stepped-well and square-well multiple-quantum-well optical modulators, Journal of Applied Physics, (1995), pp. 1411-1414.

De Vittorio et al., Electro-optic low-voltage InGaAs/GaAs multiple quantum well modulator with organic-inorganic distributed Bragg reflector, Superlattices and Microstructures, vol. 25. No. 112 (1999), pp. 313-317.

150 MHz

100 MHz

50 MHz

ELECTROABSORPTION MODULATOR FOR DEPTH IMAGING AND OTHER APPLICATIONS

CROSS-REFERENCE TO RELATED APPLICATIONS

This application claims priority from U.S. provisional patent application Ser. No. 62/126,802, filed on Mar. 2, 2015, and from U.S. provisional patent application Ser. No. 62/131,603, filed on Mar. 11, 2015, and from U.S. provisional patent application Ser. No. 62/235,962, filed on Oct. 1, 2015, each of which is hereby incorporated by reference in its entirety.

BACKGROUND

Depth cameras are used in consumer electronics, robotics, machine vision, and other applications. One method of depth imaging, time-of-flight (TOF) depth imaging, measures the time it takes for emitted light to return to a sensor to calculate the distance of points in a field of view. In a variant of TOF depth imaging, modulated light is projected on a scene and reflections of this light are demodulated at an image sensor to allow measurement of depth.

SUMMARY

Electroabsorption modulators and TOF depth imaging systems including the electroabsorption modulators are provided. Also provided are methods of using the electroabsorption modulators and TOF depth imaging systems.

In one aspect, a TOF depth imaging system for providing a depth image of an object is provided comprising a light source configured to illuminate an object with amplitude modulated light characterized by a wavelength $\lambda$ and a modulation frequency f, a surface-normal electroabsorption modulator configured to receive and to modulate reflected light from the object with the modulation frequency f, and an image sensor configured to receive and to detect modulated reflected light from the electroabsorption modulator. The electroabsorption modulator comprises a top doped layer of semiconductor, a bottom doped layer of semiconductor having opposite polarity to the top doped layer, and an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior.

In another aspect, a method of TOF depth imaging comprises illuminating an object with amplitude modulated light characterized by a wavelength $\lambda$ and a modulation frequency f to generate reflected light from the object; modulating the reflected light from the object using a surface-normal electroabsorption modulator to generate modulated reflected light, and detecting the modulated reflected light from the electroabsorption modulator via an image sensor. The electroabsorption modulator comprises a top doped layer of semiconductor, a bottom doped layer of semiconductor having opposite polarity to the top doped layer, and an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 14 clearly shows that the best value of K is about 3 for a thickness of about 1 μm when the electron-hole wavefunctions are not delocalized (i.e. $E_0$=0). However, much better depth resolution coefficients can be achieved by using significantly thicker active layers (i.e., L~4-7 μm in these cases) when the delocalizing constant electric field induces electron-hole delocalization.

DETAILED DESCRIPTION

The present disclosure relates to depth cameras, which are sometimes referred to as "3D cameras" or "range-finding cameras." The present disclosure generally uses the phrase "TOF depth imaging system," with respect to the disclosed systems but it is to be understood that the phrase is not meant to be limiting. For example, the phrase "TOF 3D camera" may be used with respect to any of the disclosed systems.

As described above, in a variant of TOF depth imaging, modulated light is projected on a scene and reflections of this light are demodulated at an image sensor to allow measurement of depth. Demodulation has been accomplished via image sensors built with pixels that perform phase demodulation, or via optical shutters, based on mechanical or electro-optic mechanisms, placed between the scene and a conventional image sensor. Although optical shutters offer simplicity, conventional systems employing such optical shutters have a number of disadvantages which has limited their commercial use.

By contrast, the disclosed TOF depth imaging systems include electroabsorption modulators which can exhibit one or more of the following features: large numerical aperture (wide field of view), high contrast, low insertion loss, high modulation frequency, and low power consumption for a given frequency and lateral resolution. The electroabsorption modulators may be used in TOF depth imaging systems including any image sensors, including conventional image sensors (e.g., charge-couple device (CCD), complementary metal oxide semiconductor (CMOS)). The use of conventional image sensors is desirable over image sensors having a more complicated phase demodulation pixel structure. The electroabsorption modulators are capable of providing TOF depth imaging systems exhibiting higher depth resolution (z dimension) and lateral resolution (x and y dimension) as compared to conventional TOF depth imaging systems including conventional electro-optic shutters. The wide field of view possible with the disclosed electroabsorption modulators means that for a given number of pixels (lateral resolution), the disclosed electroabsorption modulators can have a much smaller area, due to their higher numerical aperture, compared with conventional electroabsorption modulators used in conventional TOF depth imaging systems. With respect to optics, the wide field of view, for example, also allows TOF depth imaging systems that do not require telecentric lenses.

The disclosed electroabsorption modulators and TOF depth imaging systems have a wide range of applications, e.g., consumer electronics, robotics, machine vision, etc.

TOF Depth Imaging System

Figure 1:
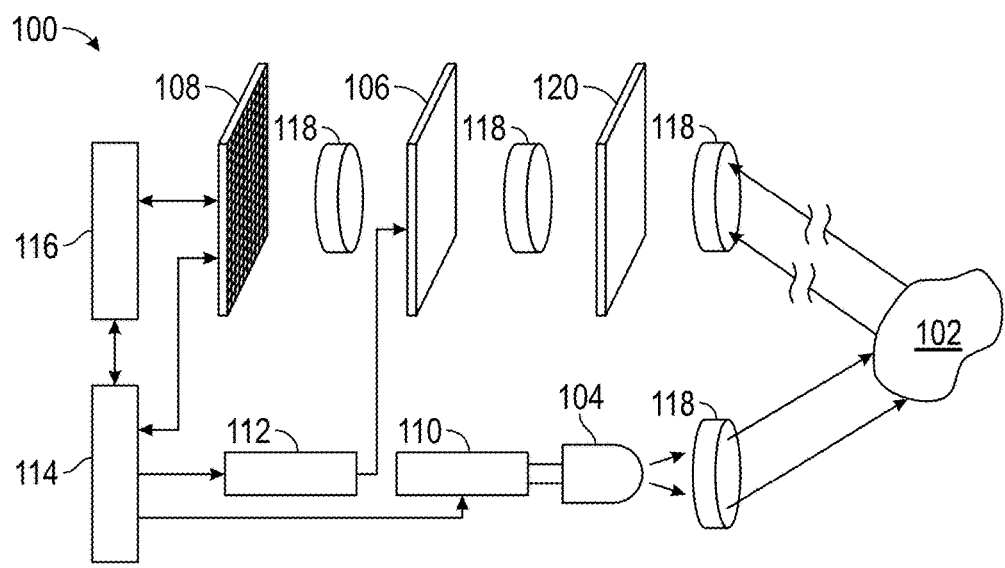
FIG. 1 depicts a TOF depth imaging system according to an illustrative embodiment.

FIG. 1 shows an illustrative TOF depth imaging system 100. The TOF depth imaging system 100 is configured to provide a depth image of an object 102 by measuring the phase delay between amplitude modulated light illuminating the object 102 and light reflected from the object 102 and by calculating a depth value from the phase delay. The TOF depth imaging system 100 comprises a light source 104 configured to illuminate the object 102 with amplitude modulated light characterized by a wavelength λ and a modulation frequency f an electroabsorption modulator 106 configured to receive and to modulate reflected light from the object 102 with the modulation frequency f, and an image sensor 108 configured to receive and to detect modulated reflected light from the electroabsorption modulator 106.

Light sources capable of being amplitude modulated to high modulation frequencies may be used, e.g., light-emitting diodes, diode lasers, etc. The modulation frequency f may be in the range of from about 1 MHz to about 100 MHz, or even greater. This includes embodiments in which the modulation frequency f is greater than about 50 MHz, greater than about 100 MHz, greater than about 140 MHz, greater than about 150 MHz, greater than about 200 MHz, greater than about 10 GHz, in the range of from about 1 MHz to about 10 GHz, from about 1 MHz to about 1 GHz, from about 1 MHz to about 200 MHz, or in the range of from about 50 MHz to about 200 MHz. Light sources emitting light having a wavelength in the near-infrared region of the electromagnetic spectrum may be used (i.e., from about 750 nm to about 1 µm). For example, light sources emitting light having a wavelength of about 850 nm may be used. However, light sources emitting light having a wavelength in the visible region (i.e., from about 400 to about 700 nm) or the short-wave-infrared region (i.e., from about 1 µm to about 2.5 µm) may also be used. Light sources emitting light having other wavelengths may also be used, e.g., light sources emitting light having a wavelength in the ultraviolet region from about 200 nm to about 400 nm.

The electroabsorption modulator 106 will be described in greater detail below. In FIG. 1, the electroabsorption modulator 106 is a surface-normal electroabsorption modulator.

The image sensor 108 may be a silicon-based image sensor comprising an array of pixels, e.g., CCD, CMOS, etc., which detect light by converting photons to current. The image sensor 108 may be characterized by the size of its pixels. In some embodiments, the pixel size of the pixels in the image sensor 108 may be substantially the same size as the selected wavelength λ of the amplitude modulated light (e.g., 850 nm). These pixel sizes are not possible using conventional electro-optic shutters due at least to the relatively small numerical aperture of such shutters. The image sensor 108 may be provided in a camera, e.g., a short-wave-infrared (SWIR) camera, such camera which may also include its own optics, e.g., lenses.

As shown in FIG. 1, the TOF depth imaging system 100 may also include a first driver 110 in electrical communication with the light source 104, a second driver 112 in electrical communication with the electroabsorption modulator 106, and a timing controller 114 in electrical communication with the first and second drivers 110, 112 and the image sensor 108. The timing controller 114 in conjunction with the first driver 110 may be used to apply a first oscillating voltage signal characterized by the modulation frequency f to the light source 104 in order to achieve amplitude modulation of light generated by the light source 104 (i.e., amplitude modulated illuminating light). In parallel, the timing controller 114 in conjunction with the second driver 112 may be used to apply a second oscillating voltage signal characterized by the modulation frequency f to the electroabsorption modulator 106 to achieve modulation of light reflected from the object 102 (i.e., modulated reflected light). In order to measure the phase delay between the amplitude modulated illuminating light and the light reflected from the object 102, the timing controller 114 may also be used to introduce additional phase shifts φ between the first oscillating voltage signal driving the light source 104 and the second oscillating voltage signal driving the electroabsorption modulator 106, i.e., additional phase shifts between the amplitude modulated illuminating light and the modulated reflected light.

The waveform of the first and second oscillating voltage signals is not limited, e.g., square waveforms, sinusoidal, and other waveforms may be used. Thus, it is to be understood that the disclosed electroabsorption modulators and the disclosed light sources may be modulated with a single frequency or multiple frequencies. Similarly the frequency of modulation may remain static (unchanged with time) or may vary with time. Each of these possibilities is encompassed by the term "a modulation frequency f" as used herein. However, a sinusoidal waveform may be advantageous for driving the electroabsorption modulator 106. In order to reduce the power needed to drive the electroabsorption modulator, a "resonating" circuit with resonance frequency equal to the modulation frequency f may be used. For example, the electroabsorption modulator 106 is primarily a capacitive element. By adding an inductor, or a series of lump or distributed inductors, the overall impedance of the circuit could be made completely a real value (very small imaginary component.)

As shown in FIG. 1, the TOF depth imaging system 100 may also include a computer 116 in electrical communication with the timing controller 114 and the image sensor 104. The computer 116 may be used to process the signals (i.e., current) from the pixels of the image sensor 108 and to calculate depth values from the measured phase delays. The computer 116 may also be used to display a depth image from the calculated depth values.

As shown in FIG. 1, the TOF depth imaging system 100 may also include optical components 118 configured to shape (e.g., so as to produce patterned or structured light) and/or to direct light within the system, e.g., lenses, mirrors, prisms, beamsplitters, etc. The TOF depth imaging system 100 may also include an optical filter 120 configured to transmit desired wavelengths of light, e.g., light having the selected wavelength λ of the amplitude modulated light, while blocking other wavelengths. However, in some embodiments, the TOF depth imaging system 100 does not include telecentric lenses, e.g., telecentric lenses for directing light to the electroabsorption modulator 106 or for receiving light from the electroabsorption modulator 106. Such lenses may be used, but are not necessary due to the large numerical aperture of the electroabsorption modulator 106.

An illustrative set of operations carried out by the TOF depth imaging system 100 of FIG. 1 is as follows. First, the timing controller 114 in conjunction with the first driver 110 applies the first oscillating voltage signal characterized by the modulation frequency f. In parallel, the timing controller 114 in conjunction with the second driver 112 applies the second oscillating voltage signal characterized by the modulation frequency f with a first phase shift (e.g., φ=0) to the electroabsorption modulator 106. The image sensor 108 captures a first image $I_1$ with an integration time $t_{int}>>1/f$ (e.g., a few milliseconds). The computer 116 collects the signals associated with the first image $I_1$ from the image sensor 108. Next, the timing controller 114 applies a second phase shift (e.g., φ=π/4). The image sensor 108 captures a second image $I_2$ and the computer 116 collects the signals associated with the second image $I_2$ from the image sensor 108. Next, the process is repeated for a third phase shift (e.g., φ=2π/4) to generate a third image $I_3$, and for a fourth phase shift (e.g., φ=3π/4) to generate a fourth image $I_4$. Next, the computer 116 determines the measured phase delay $\phi_{TOF}$ from Equation 1:

$$\varphi_{TOF} = \tan^{-1}\left(\frac{I_4 - I_2}{I_1 - I_3}\right) \qquad \text{Equation 1}$$

Finally, the computer 116 calculates the depth value d from Equation 2 wherein f is the modulation frequency and c is the speed of light:

$$d = \frac{c}{4\pi f}\tan^{-1}\left(\frac{I_4 - I_2}{I_1 - I_3}\right) \qquad \text{Equation 2}$$

Other operations may be used to extract depth values from captured images.

Figure 2:
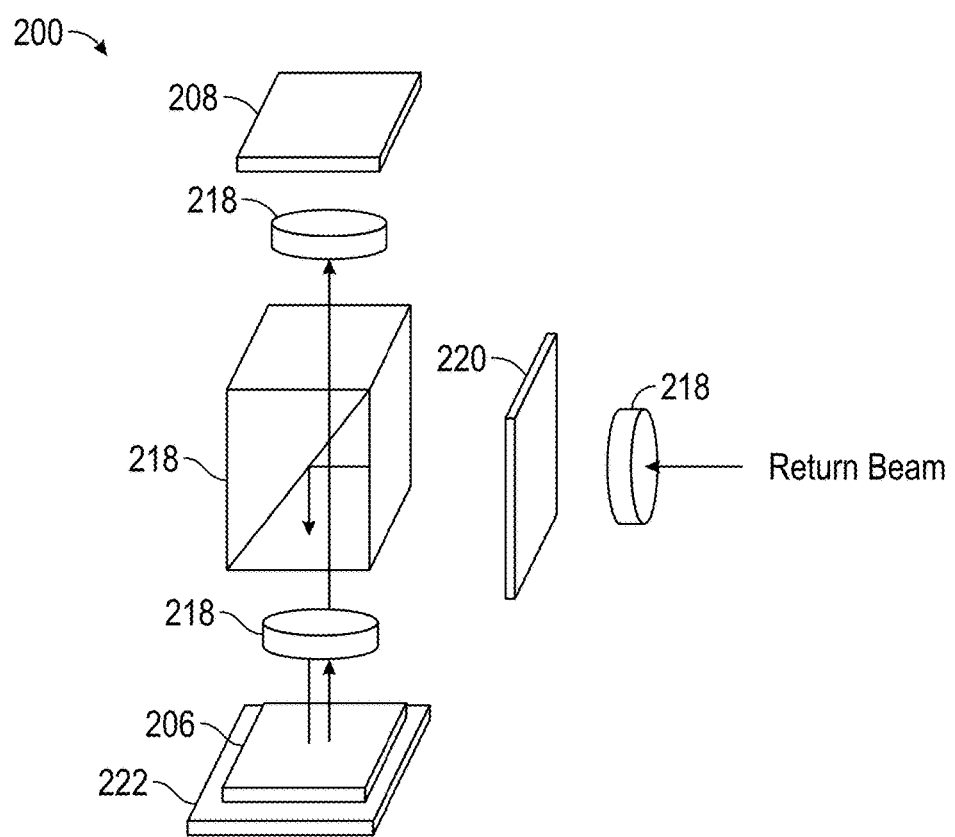
FIG. 2 depicts a portion of another TOF depth imaging system according to an illustrative embodiment.
Figure 3:
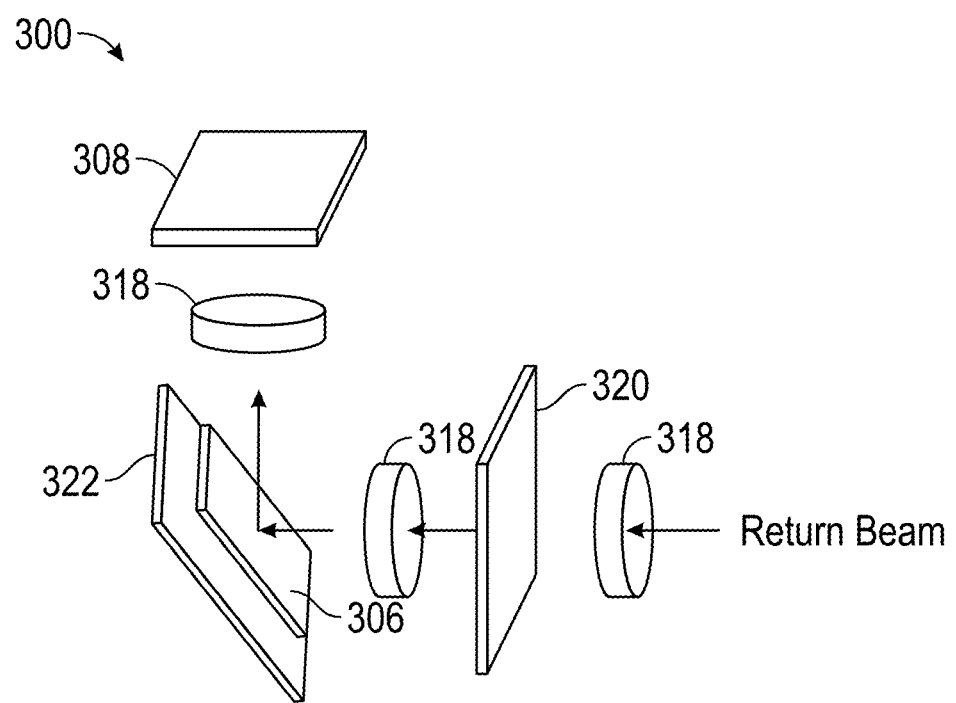
FIG. 3 depicts a portion of another TOF depth imaging system according to an illustrative embodiment.

Other TOF depth imaging systems comprising additional or fewer components or different arrangements of components as compared to the TOF depth imaging system 100 shown in FIG. 1 may be used. For example, FIG. 2 shows a portion 200 of another illustrative TOF depth imaging system. Only the image sensor 208, the electroabsorption modulator 206, some optics 218 (prism, lens), and optical filter 220 are shown. The other components of the TOF depth imaging system are similar to that of FIG. 1. As will be further described below, the electroabsorption modulator 206 of FIG. 2 is configured as a double-pass electroabsorption modulator (see FIGS. 10-12) wherein the reflected light from the object 102 (with reference to FIG. 1) passes through the electroabsorption modulator 206 twice before being directed to the image sensor 208. The electroabsorption modulator 206 may include a mirror or reflector 222. Similarly, FIG. 3 shows a portion 300 of another illustrative TOF depth imaging system. Only the image sensor 308, the electroabsorption modulator 306 including the mirror/reflector 322, some optics 318, and the optical filter 320 are shown. The other components of the TOF depth imaging system are similar to that of FIG. 1. The electroabsorption modulator 306 of FIG. 3 is also configured as a double-pass electroabsorption modulator (see FIGS. 10-12) wherein the reflected light from the object 102 passes through the electroabsorption modulator 306 twice before being directed to the image sensor 308.

The TOF depth imaging systems of FIGS. 1-3 may be implemented in a single device which may be referred to as a TOF depth imaging camera, or may be implemented in a plurality of separate, but coupled devices.

Electroabsorption Modulator

Figure 4:
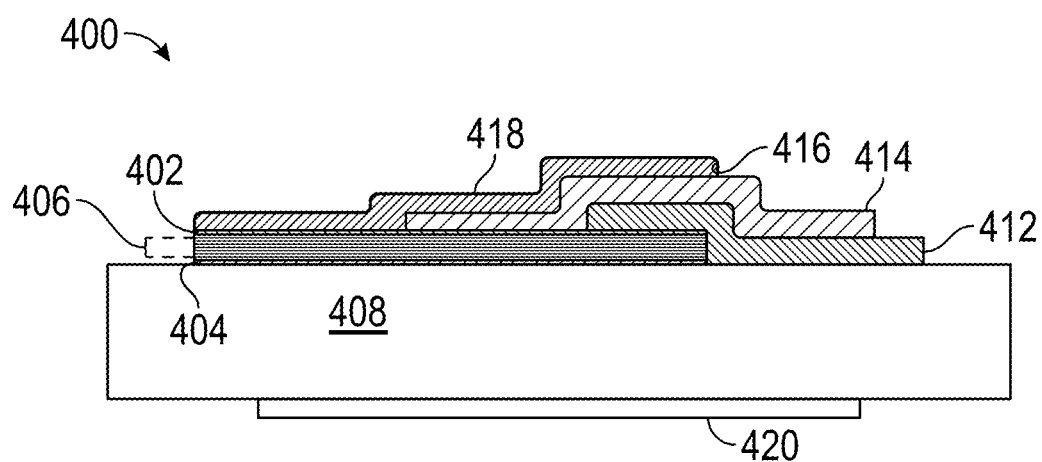
FIG. 4 depicts a single-pass electroabsorption modulator according to an illustrative embodiment.

FIG. 4 shows an illustrative electroabsorption modulator 400 which may be used, e.g., in the TOF depth imaging system 100 of FIG. 1. The electroabsorption modulator 400 comprises a top doped layer of semiconductor 402, a bottom doped layer of semiconductor 404 having opposite polarity to the top doped layer and an active layer 406 between the top and bottom doped layers 402, 404. The active layer 406 is configured as a superlattice structure comprising multiple sublayers of semiconductor configured to provide alternating quantum wells and barriers. As such, the phrase "multi-quantum well (MQW)" may be used with reference to the active layer 406.

Figure 5:
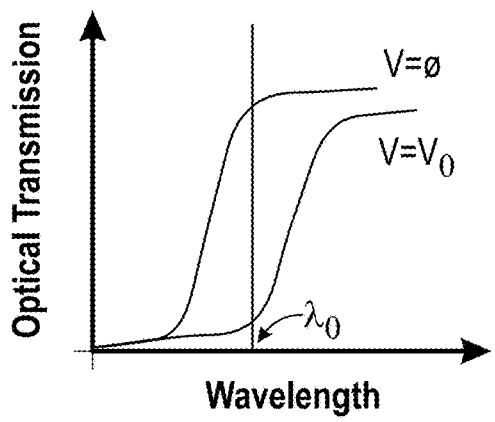
FIG. 5 shows the optical transmission characteristics of an electroabsorption modulator according to an illustrative embodiment as a function of the wavelength of light received by the electroabsorption modulator.

The active layer 406 is configured to absorb light, e.g., via an interband-transition between a conduction subband and a valence subband of the active layer 406. However, as shown in FIG. 5, the absorption edge of the active layer 406 may be red-shifted from its initial position in the absence of an external electric field (i.e., zero applied voltage) by the application of an external electric field (i.e., via an applied voltage $V_0$) according to the bulk or quantum-confined stark effect. The absorption edge of the active layer 406 may also be red-shifted from its initial position in the presence of a small external electric field (i.e., an applied low voltage, e.g., 8 V) by the application of a larger external electric field (i.e., via the applied voltage $V_0$). In FIG. 5, $\lambda_0$ is the operating wavelength of the electroabsorption modulator 400. The operating wavelength $\lambda_0$ is the wavelength at which the transmission at zero voltage (or low voltage) is relatively high, e.g., maximized, and the transmission at the higher voltage $V_0$ is relatively low, e.g., minimized.

Figure 6:
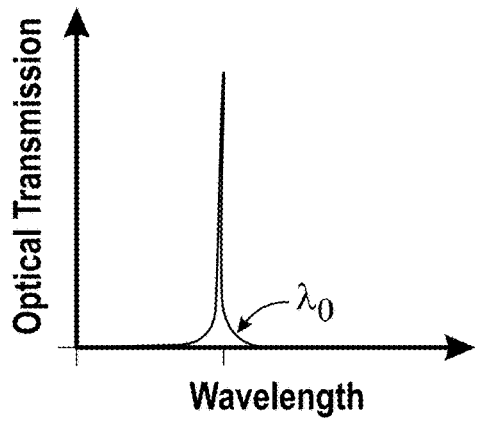
FIG. 6 shows the optical transmission characteristics of a narrow band optical filter which may be used with an electroabsorption modulator as a function of the wavelength of light received by the filter.
Figure 7:
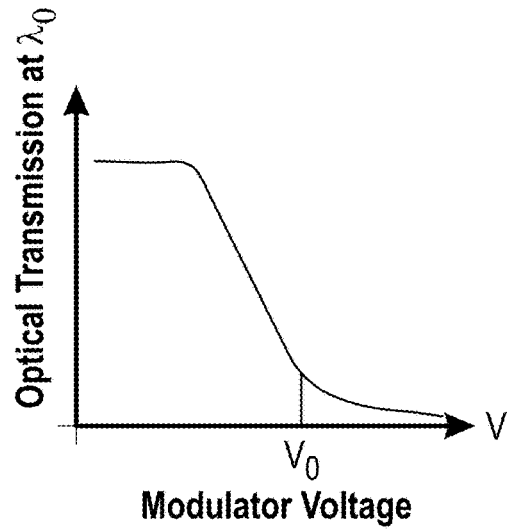
FIG. 7 shows the optical transmission of light having wavelength $\lambda_0$ of the pair of the electroabsorption modulator of FIG. 5 and the narrow band optical filter of FIG. 6 as a function of voltage applied to the electroabsorption modulator.

As shown in FIG. 1, a narrow band optical filter 120 may be placed in series with the electroabsorption modulator 400. As shown in FIG. 6, the narrow band optical filter 120 may be configured to maximize the transmission of light having wavelength $\lambda_0$ while blocking other wavelengths. FIG. 7 shows the optical transmission of light having wavelength $\lambda_0$ of the pair of the electroabsorption modulator 400 and the narrow band optical filter 120 as a function of voltage applied to the electroabsorption modulator 400. Thus, applying an oscillating voltage signal of magnitude $V_0$ to the electroabsorption modulator 400 will result in the variable transmission of light through the electroabsorption modulator 400, e.g., the modulation of reflected light received by the electroabsorption modulator 400 from the object 102 in the TOF depth imaging system 100 of FIG. 1. The frequency of the oscillating voltage signal may be the modulation frequency f as described above.

The composition of the semiconductor sublayers of the active layer 406, the thicknesses of the sublayers and the number of sublayers may be selected so that the operating wavelength $\lambda_0$ of the electroabsorption modulator 400 substantially matches the selected wavelength $\lambda$ of the amplitude modulated light in the disclosed TOF depth imaging systems as described above (which may be light having a wavelength in the short-wave-infrared region, the near-infrared region or the visible region of the electromagnetic spectrum). The composition, thicknesses and number of the semiconductor sublayers may also be selected to maximize the difference in transmission at zero voltage (or low voltage) and transmission at voltage $V_0$ at the operating wavelength of the electroabsorption modulator 400.

Figure 8:
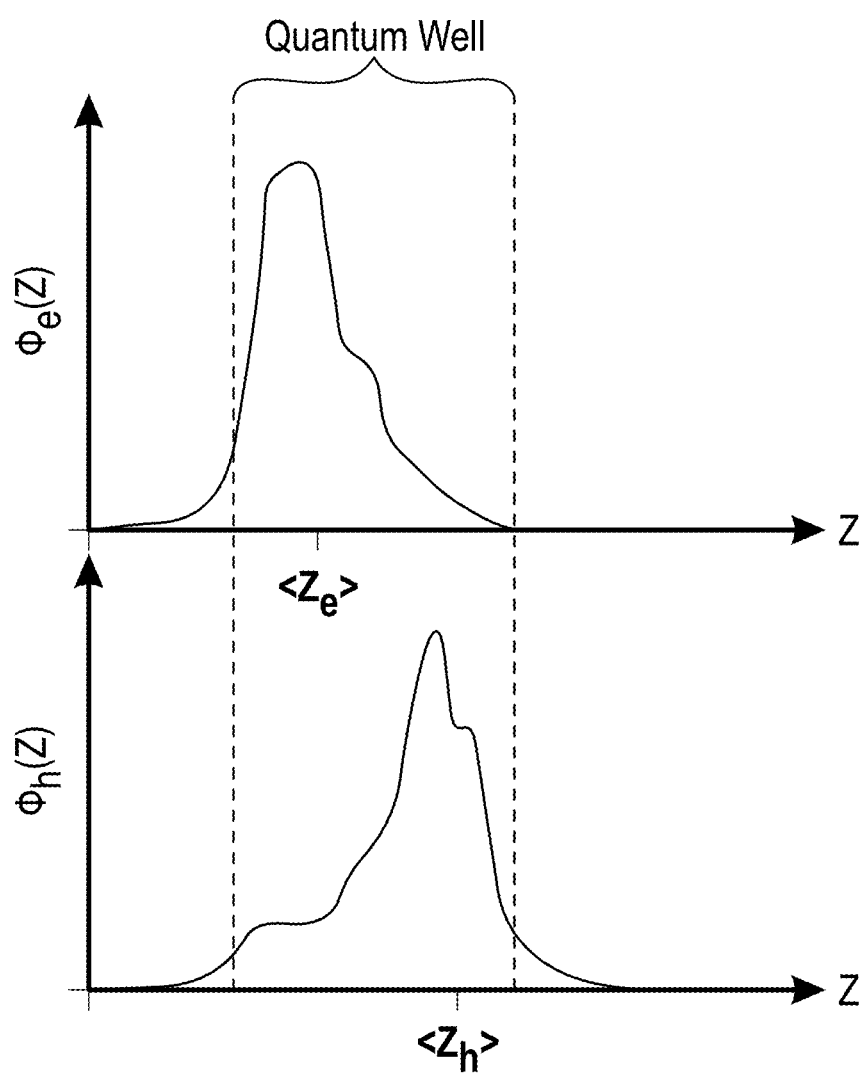
FIG. 8 illustrates the electron and hole wavefunctions for the main conduction and valence subbands involved in light absorption in the quantum wells of an electroabsorption modulator according to an illustrative embodiment as a function of position z along the direction normal to the plane of the quantum wells. The expectation position values for the electron and the hole are also shown.

Quantum well(s) (i.e., one or more or all) of the active layer 406 may be configured to exhibit delocalized electron-hole behavior. By "delocalized electron-hole behavior" it is meant that the expectation value of the electron position $\langle z_e \rangle = \int \phi_e^*(z) z \phi_e(z) dz$ in the respective quantum well is substantially different from the expectation value of the hole position $\langle z_h \rangle = \int \phi_h^*(z) z \phi_h(z) dz$ in the respective quantum well. In these equations, z is the direction normal to the plane of the quantum well, $\varphi_e$ and $\varphi_h$ are the electron and hole wavefunctions of the main subbands involved in the absorption of light of a particular wavelength (e.g., the selected wavelength $\lambda$ of the amplitude modulated light), respectively, and $\varphi_e^*$ and $\varphi_h^*$ are their complex conjugates. FIG. 8 illustrates the electron and hole wavefunctions for the main conduction and valence subbands involved in light absorption in a quantum well configured to exhibit delocalized electron-hole behavior as a function of position z along the direction normal to the plane of the quantum well. The expectation position values for the electron and the hole are also shown.

The amount of electron-hole delocalization in the quantum well(s) may vary, depending upon the desired electroabsorption modulator. The amount of electron-hole delocalization may be selected to prevent or limit a decrease in the modulation depth and modulator efficiency. In some embodiments, quantum well(s) of the active layer 406 are configured such that the expectation value of the electron position and the expectation value of the hole position differ by at least 1 atomic layer thickness. In some embodiments, quantum well(s) of the active layer 406 are configured such that the difference in the expectation value of the electron position and the expectation value of the hole position is in the range of from 1 atomic layer thickness to the thickness of the quantum well(s). This includes embodiments in which quantum well(s) of the active layer 406 are configured such that the difference in the expectation value of the electron position and the expectation value of the hole position is in the range of from 0.3 nm to 20 nm, or in the range of from 0.3 nm to 10 nm, or in the range of from 0.3 nm to 5 nm. In each of these embodiments, the quantum wells may be considered to be configured to exhibit delocalized electron-hole behavior.

The result of delocalized electron-hole behavior in a quantum well is weaker optical absorption of the quantum well due to the reduced overlap integral. As further described below, the use of such weakly absorbing quantum wells is contrary to the approach embodied by conventional TOF depth imaging systems employing conventional electro-optic shutters in which the overall thickness of the active layer is minimized to reduce the magnitude of the electric field needed to achieve the desired transmission variation and thus, to reduce power consumption. Such a conventional approach demands the use of more strongly absorbing quantum wells to accommodate for thinner active layers. However, as further described below, the inventor has determined that use of quantum wells configured to exhibit delocalized electron-hole behavior, which increases the amount of absorption edge shift per voltage, may be a useful advantage, e.g., in TOF depth imaging systems.

The number of sublayers of the quantum wells of the active layer 406, the composition of the quantum well sublayers and the thicknesses of the quantum well sublayers may be selected so that the quantum wells exhibit the delocalized electron-hole behavior described above. However, as further described below, square quantum wells composed of a single layer of semiconductor may be configured to exhibit delocalized electron-hole behavior by the application of a delocalizing constant electric field (in addition to any oscillating electric field being applied to the electroabsorption modulator 400 to achieve modulation of reflected light in the TOF depth imaging system 100 of FIG. 1 as described above.) Generally, the delocalizing constant electric field is that which is sufficient to produce a delocalization of more than 1% of the FWHM of the square of the electron wavefunctions or the square of the hole wavefunctions of the square quantum well(s). Generally, the upper limit of the delocalization is when the overlap integral is less than 1% (i.e., 0.01), when the electron and hole wavefunctions are normalized (i.e., the integral of the wavefunction squared is unity). The delocalizing constant electric field is achieved by the application of a suitable delocalizing constant voltage, e.g., 0.5 to 15 V.

The active layer 406 may comprise square quantum wells (or each of the quantum wells of the active layer may be square quantum wells). Square quantum wells are quantum wells formed from a single layer of semiconductor. As noted above and further described below, square quantum wells composed of a single layer of semiconductor may be configured to exhibit delocalized electron-hole behavior by the application of a delocalizing constant electric field. In such embodiments, the TOF depth imaging system 100 can comprise a voltage source configured to apply the delocalizing constant voltage to the electroabsorption modulator 400 to achieve the delocalizing constant electric field.

The active layer 406 may comprise stepped quantum wells (or each of the quantum wells of the active layer may be stepped quantum wells). Stepped quantum wells are quantum wells formed from at least two quantum well sublayers of semiconductor, the at least two quantum well sublayers having different compositions and thus, different energy band gaps. The number of quantum well sublayers in the stepped quantum well may be two, three, four, etc. Stepped quantum wells exhibit delocalized electron-hole behavior due to the asymmetry in the energy band structure which leads to spatial separation of electron and hole wave functions. The particular band structure of the stepped quantum well(s) is not limited, provided the band structure is that which makes the electron wavefunction center of mass different from that of the hole (as described above).

In some embodiments, the active layer 406 comprises quantum wells having a type-II heterojunction (or each of the quantum wells of the active layer 406 are quantum wells having a type-II heterojunction).

As described above, the composition, thickness and number of sublayers in the active layer 406 may be selected to achieve a desired effect on the transmission and absorption properties as well as a desired effect on the quantum well electron-hole wavefunctions of the electroabsorption modulator 400. Regarding composition, the semiconductors used for the sublayers may be group III/V alloys (e.g., binary, ternary, quaternary alloys). Group III/V alloys are useful for electroabsorption modulators to be used with light having a wavelength in the near-infrared region of the electromagnetic spectrum (e.g., about 850 nm). For example, the semiconductors used for the sublayers may be those in a GaAs-based system, e.g., any of the InGaAsP, GaInAsP, AlGaInP and AlGaAsP lattice matched systems. Strain-compensated active layers in which each of the sublayers are not lattice matched, but the overall strain is balanced to minimize or eliminate defects due to lattice mismatch may be used, e.g., a $GaAs_{1-x}Sb_x/Ga_yIn_{1-y}As_zP_{1-z}$ system.

Regarding thicknesses of sublayers, the thicknesses of the sublayers of the active layer 406 may be less than about 100 nm, less than about 50 nm, less than about 20 nm, or less than about 10 nm. This includes thicknesses in the range of from about 1 nm to about 100 nm, from about 1 nm to about 50 nm, from about 1 nm to about 20 nm or from about 1 nm to about 10 nm. As further described below, the number of sublayers and thus, the overall thickness L of the active layer 406 may be selected to minimize the depth resolution coefficient $K=1/(MD\sqrt{T_{max}})$ of the electroabsorption modulator 400 wherein MD is the modulation depth of the electroabsorption modulator 400 and $T_{max}$ is the maximum transmission value of the electroabsorption modulator 400. The selected overall thickness will be substantially thicker than a value which would be selected if the quantum wells of the active layer 406 were not configured to exhibit delocalized electron-hole behavior. In other words, the selected overall thickness may be greater than a value at which value the depth resolution coefficient K would be minimized if the quantum wells of the active layer 406 were not configured to exhibit delocalized electron-hole behavior. In some embodiments, the overall thickness L of the active layer is 1 µm or greater, 2 µm or greater, 3 µm or greater, 5 µm or greater, or 7 µm or greater. This includes embodiments in which the overall thickness L of the active layer 406 is in the range of from 1 µm to 20 µm, from 2 µm to 20 µm, from 3 µm to 20 µm, from 5 µm to 20 µm or from 7 µm to 20 µm. These overall thicknesses L are substantially thicker than the active layers of conventional electro-optic shutters. As used herein, the term "active layer" refers to the light-absorbing layers of the electroabsorption modulators. Thus, for comparison purposes, the thickness of the active layer of a conventional electro-optic shutter does not include the thickness of any layers forming an optical cavity associated with the active layer of such conventional electro-optic shutters since such an optical cavity does not substantially absorb light.

An illustrative active layer may be composed of GaAs quantum wells and $Al_xGa_{1-x}As$ barriers, e.g., 7 nm thick GaAs quantum wells and 6 nm thick $Al_{0.3}Ga_{0.7}As$ barriers. Another illustrative active layer may be composed of two-step $GaAs/Al_xGa_{1-x}As$ stepped quantum wells and $Al_xGa_{1-x}As$ barriers, e.g., 9 nm thick $Al_{0.1}Ga_{0.9}As$ first quantum well sublayers, 2 nm thick GaAs second quantum well sublayers and 6 nm thick $Al_{0.3}Ga_{0.7}As$ barriers.

Active layers for electroabsorption modulators to be used with light having a wavelength in the short-wave infrared region (SWIR) of the electromagnetic spectrum may include layers of InP/InAlAs/InGaAs/InGaAsP/InGaAsSb placed in such sequence to produce a large electron-hole wavefunction delocalization. These compositions could be either lattice matched to InP substrates, or strain compensated. An example includes $In_{0.54}Ga_{0.46}As$ (5 nm)/ $In_{0.59}Ga_{0.41}As_{0.89}P_{0.11}$ (3 nm)/$In_{0.7}Ga_{0.3}As_{0.64}P_{0.36}$ (3.5 nm)/$In_{0.53}Ga_{0.47}As$ (9 nm), all undoped. This multilayer sequence may be repeated many times to make a thick "active region" (i.e., active layer). The active region may then be surrounded by an n-type InP and a p-type InP (or a p-type lattice matched InAlAs) and finally a heavily doped InGaAs contact layer at the top to form the electroabsorption modulator. Another example includes $In_{0.53}Al_{0.47}As$ (10 nm)/$In_{0.35}Ga_{0.65}As_{0.77}P_{0.23}$ (18 nm)/$In_{0.53}Al_{0.47}As$ (1 nm)/ $In_{0.53}Ga_{0.47}As$ (3 nm)/InP (10 nm), all undoped. Again, this multilayer sequence may be repeated many times and sandwiched between similar layers to form the electroabsorption modulator.

Active layers for electroabsorption modulators to be used for light having a wavelength in the mid-wave and long-wave infrared (MWIR & LWIR) regions of the electromagnetic spectrum may include layers of semiconductor material with narrow bandgap, such as InGaAsSb/InGaSb lattice matched to a GaSb substrate, or strain balanced to a GaSb substrate with cutoff wavelengths from 2 μm to 30 μm. Also, such active layers may be made of different periods of type-II superlattices. For example, one period could be made of five bi-layers of GaSb (4 nm)/InAs (5.4 nm) and then five bi-layers of GaSb (3 nm)/InAs (4.8 nm). Electroabsorption modulators based on free-carrier absorption could also be made in the MWIR/LWIR spectral regions. For example, a layer of indium tin oxide (ITO) that is separated by a thin dielectric (e.g. $Al_2O_3$) from a highly doped semiconductor or a metal.

Active layers for electroabsorption modulators to be used for light having a wavelength in the ultraviolet (UV) region of the electromagnetic spectrum may include layers of wide bandgap semiconductors such as InGaN/GaN/AlGaInN. The piezoelectric effect combined with the strain produced by lattice mismatch could be used to produce a built-in electric field—and hence electron-hole wavefunction separation as explained herein.

It is to be understood that in the semiconductor alloy compositions described above and herein, the relative amounts of the alloys may vary, e.g., AlGaAs is understood to encompass layers wherein the relative amounts of Al and Ga vary, i.e., $Al_xGa_{1-x}As$.

With reference back to FIG. 4, the electroabsorption modulator 400 comprises a top doped layer of semiconductor 402 (e.g., p-type $Al_{0.3}Ga_{0.7}As$) and a bottom doped layer of semiconductor 404 having opposite polarity to the top doped layer (e.g., n-type $Al_{0.3}Ga_{0.7}As$) which sandwich the active layer 406. The active layer 406 may be in direct contact with the top and bottom doped layers 402, 404. Each of these layers may be disposed over a doped substrate 408. The bottom doped layer of semiconductor 404 has the same polarity as the substrate 408. The doping profile and doping level of the top and bottom doped layers 402, 404 may be selected so as not to produce a large free-carrier absorption, while the applied electric field is also maintained at a low value under the external bias. By way of example, the top and bottom doped layers 402, 404 may have a thickness in the range of from about 100 nm to about 500 nm and a doping level of about $5 \times 10^{17}$ $cm^{-3}$.

FIG. 4 also shows that the electroabsorption modulator 400 may include several other material layers. The electroabsorption modulator 400 may include a thin (e.g., about 10 nm to about 100 nm) contact layer of very highly doped (e.g., $10^{19}$ $cm^{-3}$) small bandgap material (e.g., GaAs or GaInAs) disposed over the top doped layer 402. Each of the semiconductor layers in the electroabsorption modulator 400 may be grown using a variety of epitaxial growth techniques, e.g., molecular beam epitaxy (MBE) and metalorganic vapor phase epitaxy (MOVPE). After the epitaxial layers have been grown, the resulting multilayer semiconductor structures may be processed using microfabrication techniques to deposit other material layers as described below.

As shown in FIG. 4, a mesa may be defined and etched either by wet chemical etching or dry etching techniques, e.g., reactive ion etching (RIE). Next, the multilayer semiconductor structure may be covered by a layer of an insulating material 412 (e.g., $SiO_2$, $Si_3O_4$, or an insulating polymer, e.g., polyimide or benzocyclobutene). A window may be opened in the layer of insulating material 412 and a top contact layer 414 of a highly conductive material (e.g., metal) may be disposed over the top doped layer 402. The top contact layer 414 may be configured in a pattern which is sufficient to maximize the lateral voltage uniformity at the top contact layer 414 at high frequencies while minimizing the fill-factor (i.e., blocking light). The pattern may be a fractal pattern, including a branching fractal pattern. Such patterns may be optimized using finite-element-method (FEM) simulation tools to simulate the voltage, combined with an optimization approach, e.g., genetic algorithm.

As shown in FIG. 4, a layer of a transparent conductive material 416 (e.g., indium tin oxide or graphene) may be disposed over the top doped layer 402 in order to enhance the lateral conductivity before or after the top contact layer 402 is formed.

The electroabsorption modulator 400 may include a bottom contact layer (not shown) electrically coupled to the bottom doped layer 404. This may be accomplished by accessing the bottom doped layer 404 from the top or from the bottom by making the bottom contact layer on the back of the substrate 408. In the configuration of FIG. 4, the back contact layer is desirably configured so as to minimize light blocking.

The electroabsorption modulator 400 may include a top antireflective coating 418 disposed over the top doped layer 402 and a bottom antireflective coating 420 disposed under the substrate 408 to minimize or prevent reflection due to refractive index change. The top and bottom antireflective coatings 418, 420 may be configured to minimize or prevent reflection over a wide range of incidence angles, e.g., a moth-eye configuration.

Figure 9:
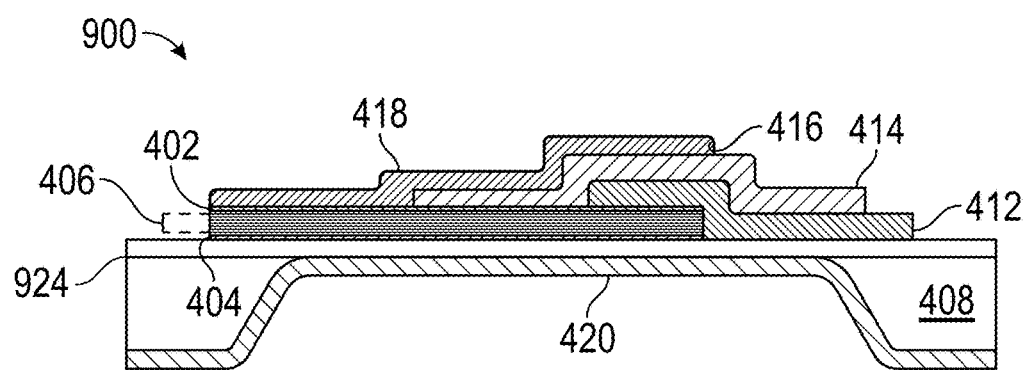
FIG. 9 depicts another single-pass electroabsorption modulator according to an illustrative embodiment.

FIG. 9 shows a variation on the embodiment of the electroabsorption modulator 400 of FIG. 4, a variation which may be advantageous when using substrates which are not sufficiently transparent to the selected wavelength λ of the amplitude modulated light. The electroabsorption modulator 900 of FIG. 9 includes each of the material layers as shown in FIG. 4. However, the electroabsorption modulator 900 of FIG. 9 also includes an etch-stop layer 924 between the bottom doped layer 404 and the substrate 408. In addition, the substrate 408 has been sufficiently etched to minimize the absorption of light by the substrate 408. In order to remove the substrate 408, a window may be defined on the substrate 408 using a masking material (e.g., photoresist, dielectric, polymer, etc.) to protect the area not to be etched. Then, a selective chemical etch may be used with a sufficiently high etch rate for the substrate 408 but a sufficiently low etch rate for the etch-stop layer 924.

The electroabsorption modulators 400, 900 of FIGS. 4 and 9 are configured as single-pass electroabsorption modulators. By "single-pass" it is meant that light received by each electroabsorption modulator passes through the respective active layer only once. Such a configuration is distinguished from conventional electro-optic shutters which include an optical cavity, e.g., by using a pair of distributed Bragg reflectors sandwiching the active layer. In such conventional electro-optic shutters, light received by the electro-optic shutter passes through the active layer many multiple times. Thus, in some embodiments, the disclosed electroabsorption modulators do not comprise an optical cavity. That is, they are "cavity-less" or "cavity-free."

Figure 10:
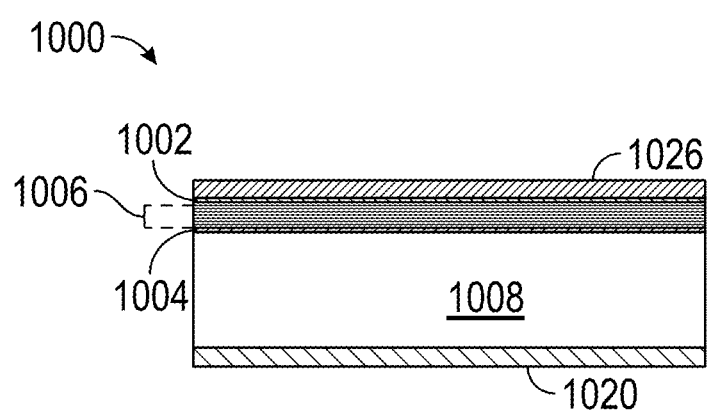
FIG. 10 depicts a double-pass electroabsorption modulator according to an illustrative embodiment.

FIG. 10 shows another illustrative embodiment of an electroabsorption modulator 1000. This electroabsorption modulator 1000 is a double-pass electroabsorption modulator. By "double-pass" it is meant that light received by the electroabsorption modulator 1000 passes through the active layer 1006 only twice. Like the single-pass electroabsorption modulators described above, double-pass electroabsorption modulators also do not comprise an optical cavity and are also distinguished from conventional electro-optic shutters. The electroabsorption modulator 1000 of FIG. 10 comprises a top doped layer of semiconductor 1002, a bottom doped layer of semiconductor 1004 having opposite polarity to the top doped layer 1002 and the active layer 1006 between the top and bottom doped layers 1002, 1004. Each of these layers is disposed over a doped substrate 1008. The top and bottom doped layers 1002, 1004 and the active layer 1006 may be configured as described above with respect to FIG. 4. The electroabsorption modulator 1000 also includes a top contact layer 1026 of a highly conductive and reflective material (e.g., gold) disposed over the top doped layer 1002 and an antireflective coating 1020 disposed under the substrate 1008. An adhesion layer (e.g., a 5 nm to 20 nm thick layer of Ti, Ni, or Cr) may be disposed between the top contact layer 1026 and the top doped layer 1002. The electroabsorption modulator 1000 may include other material layers as described above with respect to FIG. 4.

Figure 11:
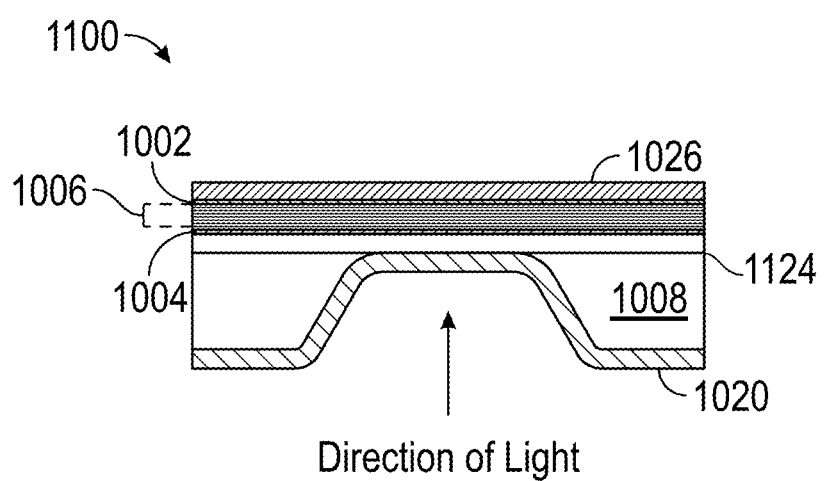
FIG. 11 depicts another double-pass electroabsorption modulator according to an illustrative embodiment.

FIG. 11 shows another illustrative embodiment of a double-pass electroabsorption modulator. The electroabsorption modulator 1100 is a variation on the embodiment of the double-pass electroabsorption modulator of FIG. 10, a variation which may be advantageous when using substrates which are not sufficiently transparent to the selected wavelength λ of the amplitude modulated light. The electroabsorption modulator 1100 of FIG. 11 includes each of the material layers as shown in FIG. 10. However, the electroabsorption modulator 1100 of FIG. 11 also includes an etch-stop layer 1124 between the bottom doped layer 1004 and the substrate 1008. In addition, the substrate 1008 has been sufficiently etched to minimize the absorption of light by the substrate 1008.

Figure 12:
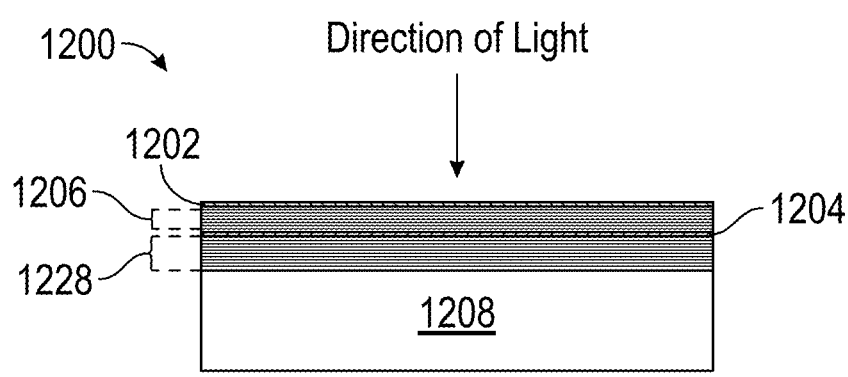
FIG. 12 depicts another double-pass electroabsorption modulator according to an illustrative embodiment.

FIG. 12 shows another illustrative embodiment of a double-pass electroabsorption modulator. The electroabsorption modulator 1200 of FIG. 12 comprises a top doped layer of semiconductor 1202, a bottom doped layer of semiconductor 1204 having opposite polarity to the top doped layer 1202 and an active layer 1206 between the top and bottom doped layers 1202, 1204. Each of these layers is disposed over a doped substrate 1208. The top and bottom doped layers 1202, 1204 and the active layer 1206 may be configured as described above with respect to FIG. 4. The electroabsorption modulator 1200 also includes a single distributed Bragg reflector 1228 disposed under the active layer 1206, e.g., between the bottom doped layer 1204 and the substrate 1208. However, the electroabsorption modulator 1200 is distinguished from conventional electro-optic shutters as described above which include a pair of distributed Bragg reflectors to provide an optical cavity. The electroabsorption modulator 1200 may include other material layers as described above with respect to FIG. 4.

The thicknesses of the material layers of the disclosed electroabsorption modulators and the doping levels of the material layers may be selected such that the electroabsorption modulator exhibits a high breakdown voltage.

The disclosed electroabsorption modulator may be characterized by its overall area relative to the overall area of the image sensor in any of the disclosed TOF depth imaging systems described above. In some embodiments, ratio of the area of the electroabsorption modulator to the area of the image sensor is less than 1. The ratio of the area of the electroabsorption modulator to the area of the image sensor may be as low as $\{\lambda/(2*n*X)\}^2$ wherein selected wavelength λ is the selected wavelength of the amplitude modulated light, n is the optical refractive index of the semiconductor(s) of the electroabsorption modulator (e.g., n is about 3) and X is the pixel pitch of the image sensor. These ratios are not possible using conventional electro-optic shutters due at least to the relatively small numerical aperture of such shutters.

The disclosed electroabsorption modulator may be characterized by a number of other performance characteristics including, but not limited to, power consumption per area, voltage, field of view, modulation frequency, contrast, extinction ratio, single-pass transmission and single-pass absorption.

The disclosed electroabsorption modulators themselves are also provided, which may be used in various applications requiring the modulation of light. In one embodiment, an electroabsorption modulator configured to receive and to modulate reflected light from an object with the modulation frequency f comprises a top doped layer of semiconductor, a bottom doped layer of semiconductor having opposite polarity to the top doped layer, and an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior. An optoelectronic device is also provided, which in embodiments, comprises such an electroabsorption modulator. A method of modulating light is also provided, which in embodiments, comprises illuminating such an electroabsorption modulator with light and applying an oscillating voltage signal to the electroabsorption modulator.

The disclosed electroabsorption modulators may be used in imaging systems for modulating photodiodes, retro-reflectors, and other large area optoelectronic devices.

The disclosed electroabsorption modulators are configured as surface normal modulators which modulate the amplitude of a light beam and are distinguished from modulators which modulate the phase of a light beam. By "surface normal" it is meant that the light to be modulated travels almost perpendicularly to the plane of the modulator. Similarly, light transmitted through the modulator travels almost perpendicularly to the plane of the modulator. As such, the substrate of the electroabsorption modulators may be composed of a material which is sufficiently transparent to the selected wavelength λ of the amplitude modulated light or which has been sufficiently etched to minimize the absorption of light by the substrate.

Design Considerations for an Electroabsorption Modulator for TOF Depth Imaging

The present disclosure is based, at least in part, upon the inventor's determination that the approach embodied in conventional TOF imaging systems employing electro-optic shutters (i.e., the use of thin active layers and optical cavities in such electro-optic shutters) in order to maximize depth resolution for a given power consumption is flawed. Below, this conventional approach is explained and distinguished from the approach embodied in the disclosed TOF imaging systems.

The power consumption P of an electroabsorption modulator comprising an active layer having a thickness L and area A at modulation frequency f is given by the following:

$$C = \varepsilon_s \left(\frac{A}{L}\right) \qquad \text{Equation 3}$$

-continued $$V = E \cdot L \qquad \text{Equation 4}$$

$$P = 1/2 C \cdot V^2 f = 1/2 \varepsilon_s A E^2 L f \qquad \text{Equation 5}$$

wherein C is capacitance, $\varepsilon_s$ is semiconductor permittivity, V is applied voltage and E is electric field.

Since the shift in the optical absorption in the electroabsorption modulator (see FIG. 5) is related to electric field E, for a given wavelength shift of $\Delta\lambda$, the required electric field is $E=(1/D)\Delta\lambda$, wherein D is the coefficient of wavelength shift and depends upon the electroabsorption modulator. (This assumes that the value of E is small enough, such that a linear shift is produced.) Then a given wavelength shift requires a given electric field, which according to the formulas above suggests that the thickness L of the active layer should be minimized in order to reduce power consumption.

However, the transmission T of the electroabsorption modulator is an exponential function of the thickness L and the absorption coefficient $\alpha$, i.e., $T=\exp^{-\alpha \cdot L}$. Thus, an electroabsorption modulator with a thin active layer will not produce a large modulation depth, even for a large change in the absorption coefficient $\alpha$.

Another issue with large L relates to the uniformity of the electric field within an active layer comprising a series of quantum wells. In general, the active layer of the modulator is sandwiched between a p-doped and an n-doped layer to form a p-i-n structure. When the thickness L is large (and therefore the number of quantum wells is large), the electric field can be localized in one side and can result in a non-uniform electric field.

To address these issues, conventional TOF depth imaging systems employing electro-optic shutters use an optical cavity around the modulator's active layer. (See, e.g., the electro-optic shutter described in Park et al., J. Micro. Nanolith. MEMS MOEMS 12(2), 023011 April-June 2013, herein "Park.") The optical cavity increases the effective path-length of the light to significantly larger than L. Therefore, even for a thin active layer, one can achieve a large absorption. By also using an asymmetric cavity, one can produce a near-zero reflection when the value of a is large and about 50% transmission when it is low.

However, the presence of the optical cavity leads to a narrow spectral response of the electroabsorption modulator. In general, the amount of enhancement is almost proportional to the cavity quality factor Q, while the optical bandwidth is inversely related to Q.

Without wishing to be bound to a particular theory, the optical cavity also leads to an important limitation in TOF depth imaging systems, i.e., the resulted dispersion of the optical cavity is such that the transmission will be a function of the incident angle at the operating wavelength $\lambda_0$.

Figure 13A:
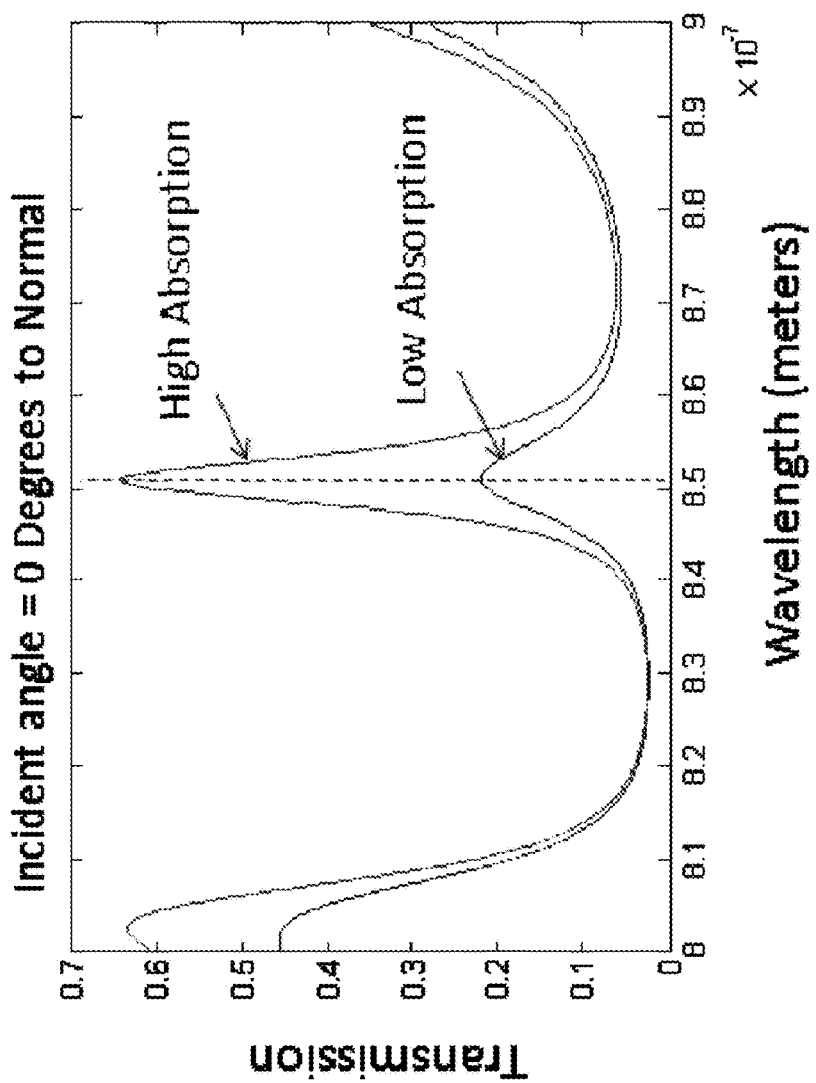
FIG. 13A shows the simulated optical transmission for an electroabsorption modulator comprising an active layer surrounded by an optical cavity showing the contrast in transmission.
Figure 13B:
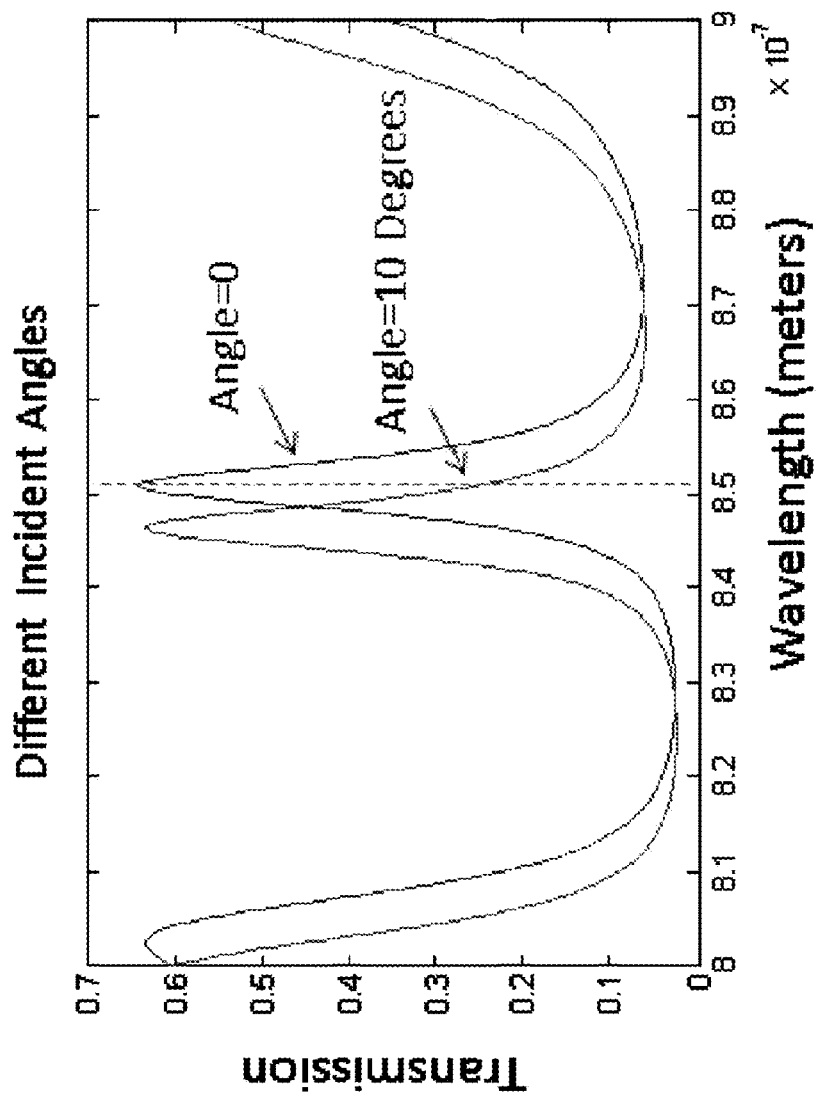
FIG. 13B shows the simulated shift in the peak transmission wavelength as a function of the incident angle. It is evident that when a beam with an incident angle of ~10° arrives, the transmission at the operating wavelength of 850 nm (shown with the dashed vertical line) drops to below 50% of the transmission of the normal incident light.

For example for the electro-optic shutter of Park, the inventor's numerical calculation shows that an angular deviation of $\theta \sim 10°$ leads to an increase in reflectivity from zero to about half of its maximum at the operating wavelength $\lambda_0$. (See FIGS. 13A-B.) The resulting numerical aperture N.A.$\sim\sin(\theta)$ of such a modulator is about $\sin(10°) \sim 0.173$, which results in a minimum effective pixel size of about $2\lambda_0/\pi \sin(\theta)$, or about 3 µm at the operating wavelength of $\lambda_0 \sim 850$ nm. Other system restrictions will only make the effective pixel size worse.

By contrast, the electroabsorption modulators disclosed herein do not require an optical cavity. Hence, the numerical apertures of the disclosed electroabsorption modulators may be very large (e.g., at least about 0.5, at least about 0.8, at least about 0.9, about 1). A numerical aperture of 0.8 leads to an effective pixel size of about 0.65 µm (about 4.6 times smaller than the effective pixel size of the conventional electro-optic shutter of Park.) This means that for a given lateral resolution, the area of the disclosed electroabsorption modulators may be $(\sim 4.6)^2$ or $\sim 21$ times smaller than the area of the conventional electro-optic shutter of Park. Therefore, the power consumption of the disclosed electroabsorption modulators may be significantly reduced as compared to the conventional electro-optic shutter of Park (see Equations 3-5). Similarly, for a given area, this means that the number of resolved lateral points (pixels) may be about 21 times larger for the disclosed electroabsorption modulators.

The large numerical apertures possible for the disclosed electroabsorption modulators may be used in different ways for different advantages in a TOF depth imaging system. The description above assumes that the electroabsorption modulator is located right above the image sensor. If, however, the electroabsorption modulator is moved to the Fourier location (e.g. by using a lens), then the larger numerical aperture means that the effective pixel size is not changed, but the area of the field of view is increased by the same factor. This will lead to the same enhancement in the number of pixels as shown in the calculations above.

In addition to the above advantages, removing the optical cavity can lead to lower power consumption per unit area and good performance can be achieved by using a relatively thick active layer comprising quantum wells configured to exhibit delocalized electron-hole behavior. This is by contrast to conventional electro-optic shutters (e.g., the electro-optic shutter of Park) which, as described above, make use of very thin active layers to reduce power consumption and strongly absorbing quantum wells and optical cavities to improve absorption. In the electro-optic shutter of Park, the active layer does not comprise quantum wells configured to exhibit delocalized electron-hole behavior.

Depth Resolution of the Electro-Optic Shutter of Park

Below, simulations were performed for the electro-optic shutter of Park (see FIGS. 2 and 3 of Park). However, the conclusions derived from these simulations are applicable to other similarly designed electro-optic shutters. As shown in Park, the active layer of the electro-optic shutter has a thickness L of about 0.5 µm. At an electric field of about 9.3 V/µm, the transmission T of the electro-optic shutter can be changed from about 65% to about 15%. Thus, the transmission maximum $T_{max}$ is about 0.65 and the modulation depth MD is about (0.65−0.15)/0.65=0.77.

The relative depth resolution $\Delta Z/Z$ (depth resolution $\Delta Z$ at a given distance Z) of an electroabsorption modulator is nearly proportional to $K=1/(MD\sqrt{T_{max}})$ (See, e.g., Robert Lange and Peter Seitz, "Solid-State Time-of-Flight Range Camera," IEEE JOURNAL OF QUANTUM ELECTRONICS, VOL. 37, NO. 3, p. 390, 2001). The value of K is unity for an ideal electroabsorption modulator (i.e. one having a $T_{max}$ of 100% and a MD of 100%). Thus, for any electroabsorption modulator having a lower $T_{max}$ or a lower MD, the value of K will increase above unity. This indicates the effect of the electroabsorption modulator in the depth resolution. Other system variables such as the illuminating power, illumination modulation depth, and the modulation frequency affect the overall depth resolution. For the electro-optic shutter of Park, K is about 1.46, which means that the depth resolution is about 1.46 times the depth resolution of a system with an ideal modulator.

Depth Resolution of a Modified Electro-Optic Shutter

Next, simulations were performed for a modified electro-optic shutter similar to Park, but without an optical cavity and a thicker active layer, i.e., an active layer having a thickness L of 2.0 μm. The absorption coefficient changes from about 800 cm$^{-1}$ to about 7400 cm$^{-1}$ for a change of electric field from 0 to 9.3 V/μm. The transmission T changes from about 0.22 to about 0.8. $T_{max}$ is about 0.85, MD is about 0.74 and K is about 1.46. This shows that the relative depth resolution of the modified electro-optic shutter is similar to the electro-optic shutter of Park. However, the power consumption of the modified electro-optic shutter is increased by about the ratio of the thicknesses of the active layers, i.e., about 2 μm/0.5 μm=4. This leads to the conventionally accepted conclusion that an optical cavity and a thinner active layer can be used to achieve a similar depth resolution, but with reduced power consumption. However, the inventor has determined that this conventionally accepted conclusion is flawed.

As further described below, it is shown that electroabsorption modulators which comprise relatively thick active layers comprising quantum wells configured to exhibit delocalized electron-hole behavior, but which do not comprise an optical cavity can achieve improved performance as compared to conventional electro-optic shutters as well as provide lower power consumption per unit area.

Depth Resolution of an Electroabsorption Modulator Comprising an Active Layer Comprising Quantum Wells Configured to Exhibit Delocalized Electron-Hole Behavior Simulations were performed for an electroabsorption modulator comprising an active layer having a thickness L of about 4 μm and an operating wavelength $\lambda_0$ of about 860 nm. (However, as described above, the energy band gap of the active layer may be modified depending upon the desired wavelength of light.) The quantum wells of the active layer were square quantum wells which were configured to exhibit delocalized electron-hole behavior by the application of a delocalizing constant electric field (i.e., by applying a delocalizing constant voltage to the electroabsorption modulator). In particular, a delocalized constant voltage was applied to the electroabsorption modulator and then an additional oscillating voltage signal was applied. It is noted that the delocalizing constant electric field has a frequency of nearly zero and thus, requires negligible power as predicted by Equations 3-5. A delocalizing constant electric field $E_0$ of 9.7 V/μm was used and a modulating electric field $E_m$ of 3 V/μm was used to change the electric field from 9.7 V/μm to 12.7 V/μm for the high and low transmission states of the electroabsorption modulator.

At a wavelength of 860 nm, the modulating voltage makes the absorption coefficient of the electroabsorption modulator change from about 700 cm$^{-1}$ to about 4500 cm$^{-1}$. For the thickness L of 4 μm, $T_{max}$ is about 0.755, MD is about 0.79 and K is about 1.45, which is similar to the modified electro-optic shutter described above and better than the electro-optic shutter of Park. However, the change in electric field used to achieve these results is only about 3 V/μm, i.e., about 3.1 times smaller than before.

Using the power consumption equation (Equation 3), the thickness of the active layer of the electroabsorption modulator is 8 times larger that of the electro-optic shutter of Park, but the electric field is 3.1 times smaller (leading to a 3.1$^2$=9.6 times smaller ratio). The total effect is that the power consumption is 8/9.6 or 83% of the cavity design, while the depth resolution is about 12% better.

Figure 14:
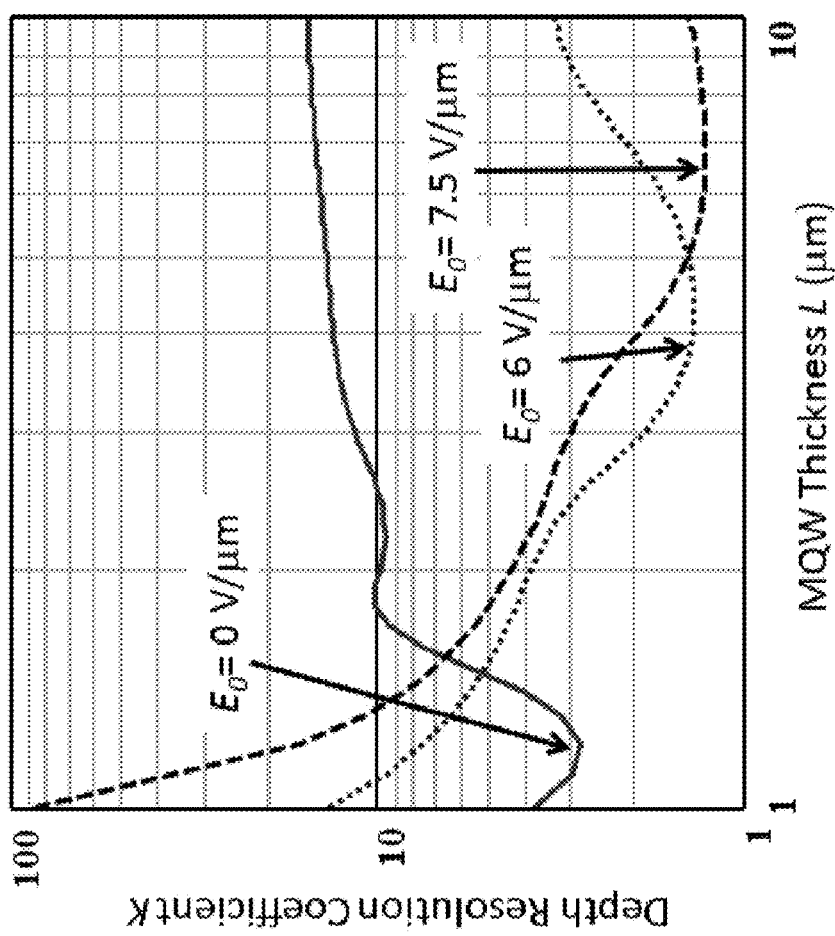
FIG. 14 shows the depth resolution coefficient K as a function of the multi-quantum well (MQW) thickness L (i.e., the active layer thickness) for different values of delocalizing constant electric field $E_0$.

FIG. 14 illustrates the exact relation between the depth resolution coefficient K, the delocalizing constant electric field $E_0$, and the thickness L of the active layer. The results were obtained for an electroabsorption modulator having an area A of 6 mm×7 mm. The power consumption was set at 14 Watts for a modulating frequency f of 10 MHz. As shown in FIG. 6, in the absence of the delocalizing constant electric field (i.e. $E_0$=0), the depth resolution coefficient K is minimized at L∼1.2 μm. However, this minimum value is about K∼3, which means three times worse than the performance of an ideal electroabsorption modulator. However, when the delocalizing constant electric field $E_0$ is increased to delocalize the electron-hole wavefunctions, thicker active layers give much better depth resolution. For example, for $E_0$=7.5 V/μm, the best thickness is about L=7 μm and the depth resolution is very close to the ideal performance with K∼1.2.

Additional improvements in efficiency as compared to conventional electro-optic shutters (e.g., as described in Park) are possible when taking into account the increased numerical aperture of the disclosed electroabsorption modulators. As described above, due to the increased numerical aperture, the area of the disclosed electroabsorption modulators may be (∼4.6)$^2$ or ∼21 times smaller than the area of conventional electro-optic shutters, resulting in even further reduced power consumption.

As described above, the present example is based on an electroabsorption modulator comprising an active layer based on square quantum wells. However, the results may be generalized for any quantum well design. Nevertheless, quantum wells (e.g., stepped quantum wells) which are configured to exhibit delocalized electron-hole behavior by adjusting the number of sublayers of the quantum wells, the compositions of the quantum well sublayers and the thicknesses of the quantum well sublayers, may be particularly advantageous. This is because such quantum wells may replace the need for the application of a large delocalizing constant voltage to delocalize the wavefunctions. Thus, the results described above may be achieved starting at a much lower delocalizing constant field than 9.7 V/μm, e.g., even near zero bias. The equivalent "built-in" delocalizing constant electric field $E_0$ for such quantum wells is approximately equal to an opposite electric field that leads to elimination of electron-hole delocalization, or when $\langle z_e \langle \sim \rangle z_h \rangle$.

Discussion of Electron-Hole Delocalization in an Electroabsorption Modulator Based on Quantum Confined Stark Effect (QCSE)

The principle of operation of the electroabsorption modulators is based on the so-called quantum confined stark effect (QCSE).

An electroabsorption (EA) modulator is a device made of a quantum well (QW), or a series of QW, embedded within a stack of doped semiconductors such that the electric field within the QW region can be changed by exerting an external voltage across the device.

The absorption edge of the device is the wavelength below which the absorption of light increases exponentially (due to increasingly higher energy of photons versus the effective bandgap of the QW).

The principle of QCSE shows that once an electric field is applied to the QW region the absorption edge will shift to the longer wavelengths.

The operation of the EA modulator is based on the absorption edge shift: a beam of light with wavelength longer than absorption edge can pass through the modulator with little attenuation. However, when an electric field is applied, the absorption edge shifts to longer wavelengths beyond the wavelength of light. This leads to a significant increase of light absorption by the QW leading to a significant reduction of light transmission (high attenuation). Therefore, the transmission of light can be modulated with an external voltage applied to the device.

The wavelength of the excitonic peak of a QW shifts in quadratic relation versus the applied electric field (and hence, the applied voltage). As described below, the inventor has determined that this quadratic relation can be used to enhance the performance of surface-normal EA modulators, such as ones used for Time of Flight (ToF) 3D imaging described above. The absorption edge of the QW also shifts with quadratic (or even higher order) versus the applied electric field.

In a conventional QW, the ground-state electron and hole wavefunctions are symmetric, and hence the expectation value for the position of the electrons and holes confined in the QW at the ground state is in the middle of the QW. Such colocation leads to a strong optical dipole matrix element, and hence a large optical absorption coefficient. A similar statement may be made for the excitons.

However, there are two methods that may produce electron-hole (e-h) delocalization: (a) application of an external electric field (e.g. external voltage), and (b) design of the QW potentials. The inventor has determined that both of these methods may be used to enhance the performance of surface-normal EA modulators, such as ones used for Time of Flight (ToF) 3D imaging described above.

Figure 15:
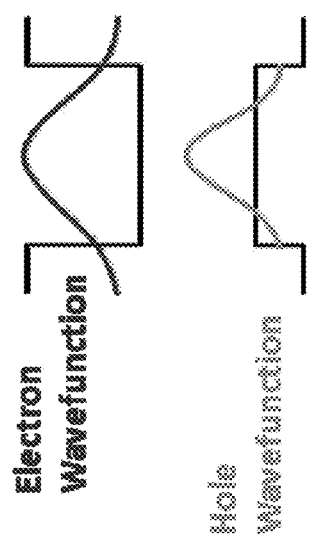
FIG. 15 shows the electron and hole wavefunctions for a conventional, square quantum well (QW) (left) and the change of its optical absorption spectra versus the external applied field (right).
Figure 15:
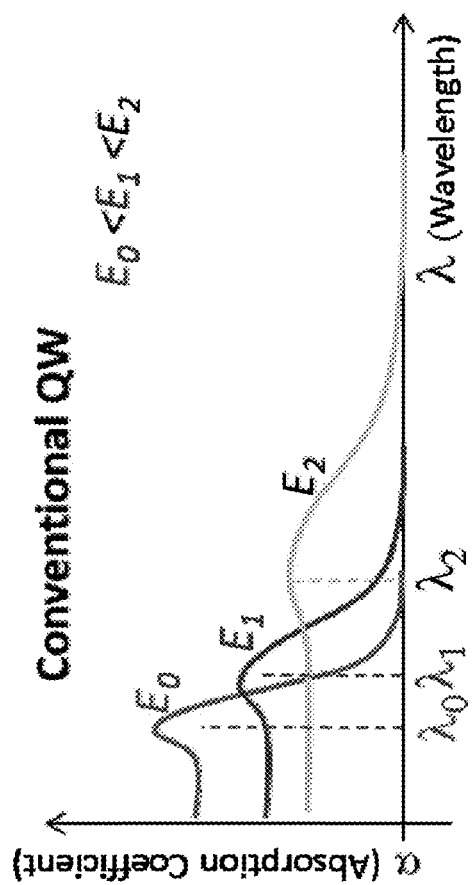

As described above, an external electric field leads to QCSE that shifts the absorption edge. In conventional EA modulators comprising conventional QWs, the resulting e-h delocalization leads to a reduction of the light absorption (FIG. 15).

As described above, the QCSE shift is a quadratic function of the electric field (approximately), which means that the shift per given change of electric field is higher at higher electric fields (Equation 6):

$$\lambda \cong \lambda_0 + AE^2 \Rightarrow \frac{\partial \lambda}{\partial E} \cong 2AE \qquad \text{Equation 6}$$

Figure 16:
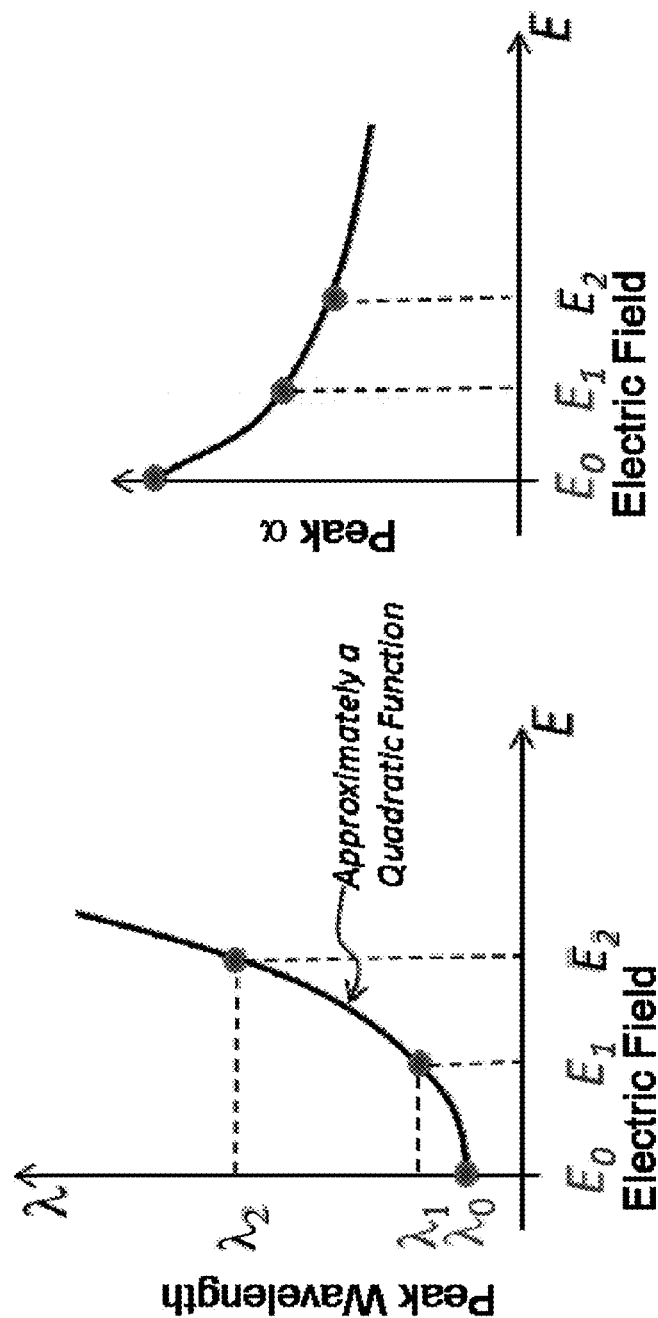
FIG. 16 shows the change of peak absorption wavelength (left), and the peak absorption coefficient versus the applied external electric field (right). The change in the absorption edge wavelength will be similar to the change in the absorption peak.

This concept is illustrated in FIG. 16 (left image), which also shows the rapid decrease of the peak absorption coefficient (right image) versus the applied external electric field.

Figure 17:
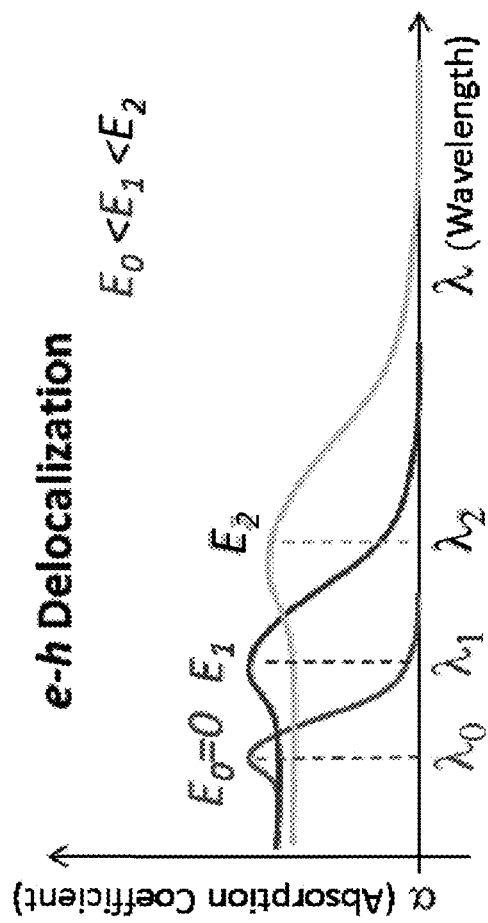
FIG. 17 shows a stepped QW according to an illustrative embodiment (left), and the change of its optical absorption spectra versus the external applied field (right).
Figure 17:
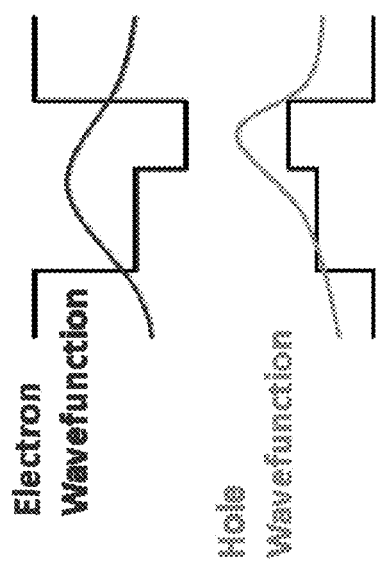

Next, the effect of electron-hole (e-h) delocalization of a QW is considered. FIG. 17 illustrates a QW potential designed to exhibit e-h delocalization behavior (left image). The result is a reduction of the optical absorption peak, but an increase in the change of peak absorption wavelength versus applied external field $$\left(\text{i.e.} \frac{\partial \lambda}{\partial E}\right)$$

(right image).

Since the electrons and holes are separated, this may be modeled as an effective "internal electric field," with the value $\Delta E$, which is approximately the magnitude of the external field required to push back the e-h expectation position on top of each other (i.e. co-localize them). Then, it can be shown that the quadratic curve of FIG. 15 (left) is now shifted by $\Delta E$ to the left (see FIG. 18, left). The approximate formula for the peak absorption wavelength, and its change versus external field E is then:

$$\lambda \cong \lambda_0 + A(E + \Delta E)^2 \Rightarrow \frac{\partial \lambda}{\partial E} \cong 2A(E + \Delta E) \qquad \text{Equation 7}$$

Equation 7 shows that the shift of the peak absorption wavelength (and the absorption edge) is now a more sensitive function of the external field E. For a visual comparison see the difference between solid line for QW designed to exhibit e-h delocalization behavior, and dotted line for conventional QW shown in FIG. 18.

As explained above, a similar effect may be achieved by applying a constant external field of $E_0 > 0$ to a square quantum well, which leads to a similar enhancement of the change of wavelength, and a similar reduction in optical absorption coefficient, as effectively $E_0 = \Delta E$ in Equation 7.

Figure 18:
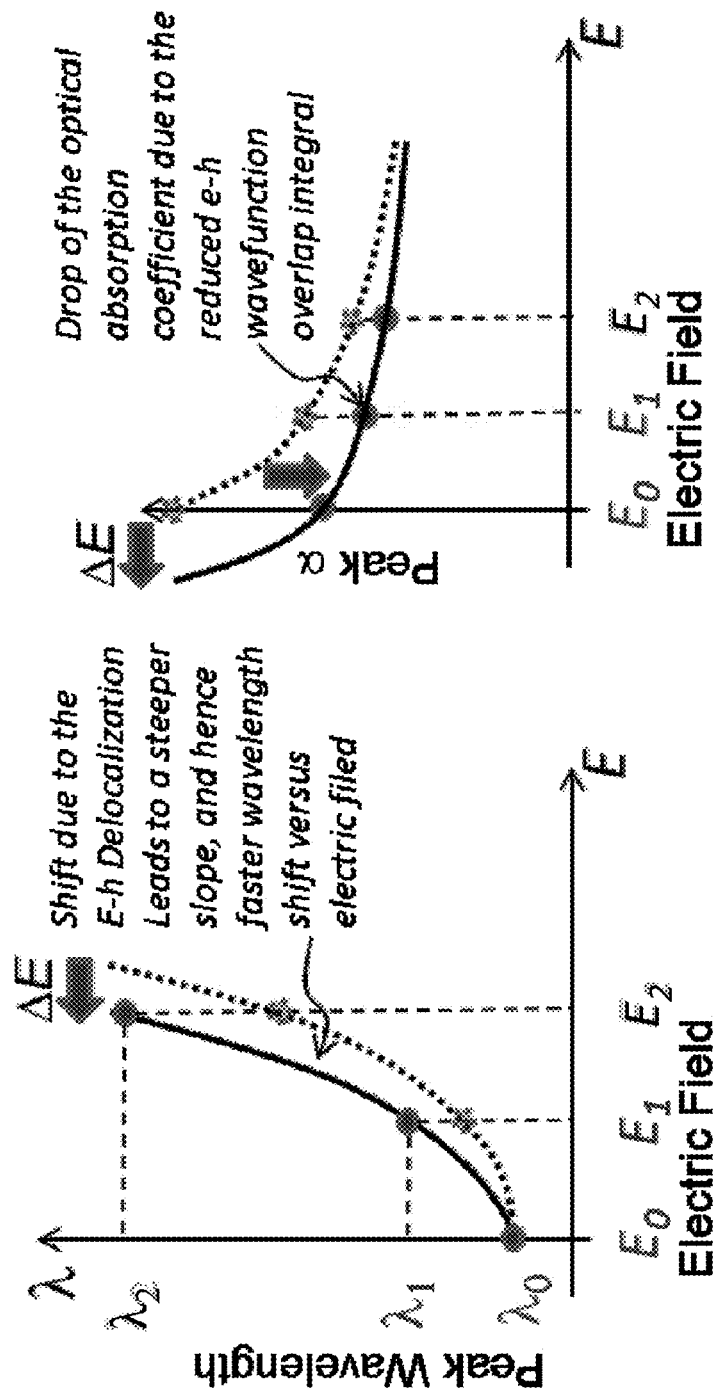
FIG. 18 shows that the change of peak absorption wavelength versus the applied external electric field is shifted to the left by ΔE (left) and that the peak absorption coefficient is now smaller than a conventional QW (right). Solid line shows the case for a QW with electron-hole delocalization, dotted line shows the case for a conventional QW.

A consequence of the e-h delocalization is the reduction in the optical transfer matrix element, due to the reduced wavefunction overlap integral, which reduces the optical absorption coefficient (see FIG. 18, right). However, the inventor has determined that despite this consequence, in ToF imaging, the performance of such a surface-normal EA modulator may surpass a conventional surface-normal EA modulator that does not comprise QWs configured to exhibit e-h delocalization behavior.

In particular, the inventor has determined that the reduced absorption coefficient $\alpha$ can be compensated by increasing the thickness of the modulator, since the overall transmission is $\exp(-\alpha \cdot L)$. However, for a required electric field E the voltage is $V = E \cdot L$ and so the thicker the modulator (bigger L), the higher the voltage V. Since the power consumption for the modulator is proportional to $CV^2$, and V is proportional to L and C is inversely proportional to L, the overall power consumption is proportional to L (power linearly increases with thicker modulator for a given electric field). However, the transmission is an exponential function of L, and at some thickness the benefit will be optimum for a given power consumption. As shown in FIG. 14, numerical simulations show this optimum point gives a better modulator performance for an e-h delocalization (i.e. $\Delta E$ or $E_0 > 0$) than a conventional modulator. For example, FIG. 14 shows that the performance of a modulator with e-h delocalization (indicated by $E_0 = 6$ V/µm) is significantly better than a conventional QW modulator (with $E_0 = 0$ V/µm). However, the e-h delocalization means that a larger L is now producing the optimum performance ($L_{optimum} \sim 4$ µm for the e-h delocalization).

Methods

Methods of using the disclosed electroabsorption modulators and TOF depth imaging systems are also provided. The electroabsorption modulators may be used in various applications requiring the modulation of light (e.g., light having a wavelength in the short-wave-infrared region, the near-infrared region or the visible region of the electromagnetic spectrum). Such applications involve illuminating any of the disclosed electroabsorption modulators with light and applying an oscillating voltage signal characterized by a desired frequency in order to modulate the transmission of the light through the electroabsorption modulator.

As described above, one such application is TOF depth imaging. Such an application involves illuminating an object with amplitude modulated light characterized by a wavelength $\lambda$ and a modulation frequency f to generate reflected light from the object, modulating the reflected light from the object using any of the disclosed electroabsorption modulators to generate modulated reflected light, and detecting the modulated reflected light from the electroabsorption modulator via an image sensor. Any of the disclosed TOF depth imaging systems may be used to carry out such an application.

EXAMPLE

A 150 MHz Time of Flight 3D SWIR Camera

This example presents the results of the first 3D time of flight (ToF) camera operating in the short-wave infrared (SWIR) at 1550 nm. It includes a surface-normal cavity-less electroabsorption modulator with a backside mirror and an Er doped fiber laser amplifier (EDFA) at 150 MHz modulation frequency. A field programmable gate array (FPGA) generates four quadrature phase shifts on the modulator's driver with respect to the EDFA. Therefore, a commercial SWIR camera turns into a 3D camera. A 4-mm objective lens maps the reflected light from an illuminated scene onto the backside of the modulator. The reflected light from backside, in turn, is mapped onto the 320 by 256 pixels image sensor of the SWIR camera by the 50-mm camera lens. The results are presented below along with a discussion of design details and system performance. The capability of adding depth dimension to the SWIR camera greatly increases the versatility of SWIR applications.

SWIR cameras have several advantages over devices that work in the visible or longer wave infrared bands. In addition to the ability to see through smoke and haze, the SWIR band provides realistic night vision that is useful for navigation and is powerful for machine vision due to its ability to see through glasses and layers that are not captured by visible cameras. By adding depth measurement capabilities to SWIR cameras as is shown in this example, an unique time of flight system has been created that has the ability to take advantage of SWIR band optical properties.

This example is a demonstration of the first indirect ToF 3D SWIR camera based on the 4-phase technique that is operating at 150 MHz modulation frequency. In this method, a modulated light illuminates a scene and the reflected light is captured by a ToF sensor. Since depth measurement is tied to the detection of phase accumulation of traveling light in the path of source-object-imager, higher time resolution can be achieved at higher modulation frequencies. A key innovation in this system is the use of the electroabsorption modulator described below as a global shutter to demodulate the reflected light from an object before being captured by an image sensor. Such a modulator can operate at GHz range frequencies providing unprecedented resolution performance. In addition, such a modulator is very good fit for near-infrared (NWIR) applications as this feature allows one to take advantage of off the shelf state-of-the-art CMOS image sensors.

In the 4-phase technique, a scene is illuminated with a modulated light and the reflected light from the objects in the scene is demodulated with four different phase shifts and captured by each individual pixel of the image sensor in a certain integration time to generate four quads of $Q_0$, $Q_{90}$, $Q_{180}$ and $Q_{270}$. The phase delay associated with the path of source-object-imager can be calculated through cross-correlation of the illuminated signal and reflected signal with the following expression:

$$\varphi = \tan^{-1}[(Q_{270}-Q_{90})(Q_0-Q_{180})] \quad \text{Equation 8}$$

The subtraction and division between quads cancels out any system response and offset, reducing the complexity in calibration of the system. The uncertainty in depth resolution is directly proportional to the product of the modulation-demodulation coefficient ($k = C_{mod} * C_{dem}$) and the modulation frequency:

$$\Delta\varphi \sim \sqrt{(B+A)}/(f_{mod} * k * A) \quad \text{Equation 9}$$

where B is the noise from image sensor and background, A is the demodulated signal, and it is the reflected power from scene, which is captured by each image sensor's pixel. In the regime that is limited by signal's shot noise, the accuracy can be improved by the square root of the reflected power depth, whereas it can be directly improved by modulation frequency and modulation contrast. Therefore, considering power consumption, it is more beneficial to choose a better modulator that offers high modulation depth and modulation frequency than increasing illumination power.

The demodulation process to unwrap the phase can be persuaded both optically and electronically. In the electronics-level modulation, each pixel of the image sensor demodulates the captured signal. Such a specialized pixel is called a photo-modulated device (PMD). Several ToF cameras have been developed based on this method, all operating at 850 nm. Despite the fact that this approach is attractive due to its compatibility with CMOS processes, modulation frequency beyond 100 MHz is very challenging due to controlling the level of cross-talk with adjacent pixels. In addition, for megapixel ToF sensing, local electronic modulation puts strict limits on pixel size due to the complexity of the individual pixels. The highest frequency that has been reported in electronics-level modulation is 130 MHz.

On the other hand, optics-level demodulation can reach GHz speeds and allows for decoupling the demodulation process from the image acquisition. In this approach, a global optical shutter is placed between the scene and image sensor to demodulate the incoming signal and unwrap the phase. The conventional optics-level demodulation approach taken by Park has been described above (an electro-absorptive cavity based modulator at 850 nm as a global shutter and an RGB image sensor to capture demodulated quads). However, reaching speeds in the GHz range requires a significant reduction of the modulator size, regardless of modulation mechanism. Therefore, a working GHz system requires a modulator that is smaller than the image sensor. As a result, mapping the incoming image to the modulator requires high NA optics. High NA optics is associated with focal beams with high angles. This implies that the modulator has to maintain its performance for high angles of incidence. Lack of a wide angular acceptance leads to a limitation on the modulation frequency.

As described above, implementing an optical cavity (as done in Park) increases the modulation depth by increasing optical path at the expense of severe limitation on the range of acceptance angles. A small angle of acceptance sets an upper limit on the NA of optics that can be used to couple the beam passing from the modulator to the image sensor. As a result, the approach of Park cannot shrink the size of the modulator in order to reach GHz speeds. In fact, optics-level modulators have stayed below 20 MHz modulation frequency due to the aforementioned limitations. In addition, the optical cavity increases the sensitivity of the modulator to the applied voltage as well as junction temperature, resulting in further complexity at a system level. As a result, conventional approaches have shifted back to using electronic-level modulation to realize the next generation 3D cameras.

By contrast, the approach taken in the present disclosure involves optics-level modulation; therefore, it does not have the limitations of electronics-level modulation. In addition, as described above, it is fundamentally much more sensitive to applied voltage compared to the modulator of Park due to special design of the disclosed modulator. The exceptional sensitivity allows the elimination of an optical cavity based structure. The cavity-less feature provides a modulator with very high angle of acceptance that is favorable for high NA optics. Therefore GHz speeds can be realized due to the reduction of constraints on the modulator's size.

Figure 19:
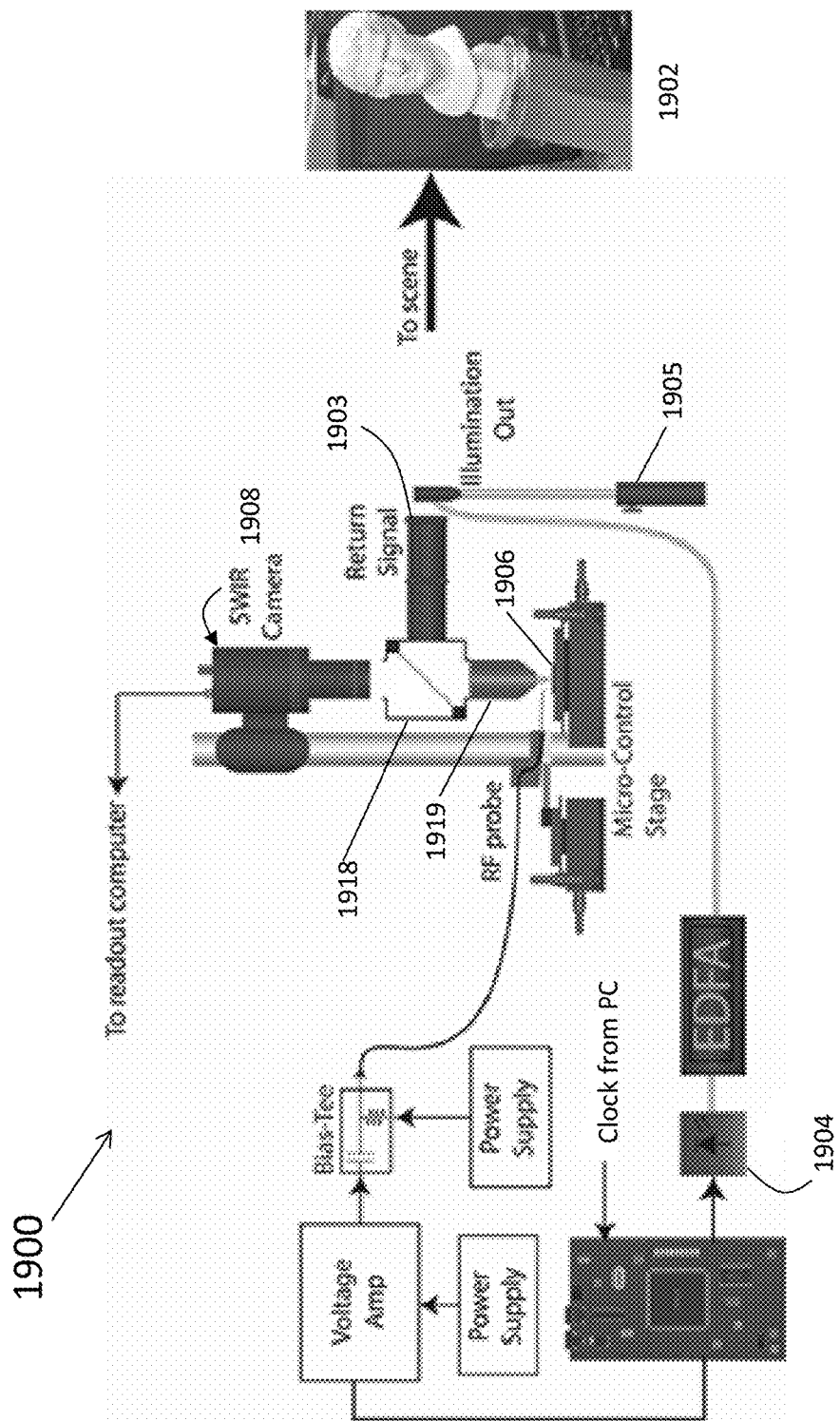
FIG. 19 depicts another TOF depth imaging system according to an illustrative embodiment.

FIG. 19 illustrates the TOF depth imaging system 1900 used in this example. The experimental setup includes several electrical and optical components working together, including the light source 1904 (a laser diode operating at 1550 nm), the electroabsorption modulator 1906, and the SWIR camera 1908 (which includes a 50 mm camera lens and an image sensor). Additional details are further described below.

The microscope is arranged based on infinite optics. After the modulated illumination signal is incident on a scene 1902, the reflected signal is collected through a lens tube 1903 to reduce noise from source outside of the scene 1902. The collected signal is split by a 50/50 beam splitter 1918, sending half of the received signal into a 50× microscope objective 1919. The objective 1919 focuses the received signal onto the modulator's 1906 surface. The backside of the modulator 1906 is coated with gold acting like a mirror as well as back electrical contact to drive the modulator 1906. The modulator 1906 is configured as a double-pass electroabsorption modulator as described above. The modulator 1906 is configured for use with SWIR light (e.g., 1550 nm light) as described above, including an active layer comprising quantum wells configured to exhibit delocalized electron-hole behavior. Here the signal is demodulated and recollected by the microscope objective 1919. The collimated signal passes through the beam splitter 1918 and finally is mapped on the camera's 1908 pixels through the camera lens. A field of view (FOV) of 8 degree (horizontal) by 11 degree (vertical) is imposed by the 50 mm camera lens with f-number of 1.8. The image of modulator 1906 is mapped into the image sensor of the camera 1908 with a magnification of 12.5 (ratio of camera lens to objective lens: 50 mm/4 mm). The image sensor has 320 by 256 pixels of 30 micron pitch, producing an imaging area of 9.60 mm by 7.68 mm. Therefore, the modulator area has to be ~0.5 $mm^2$ (0.768 mm by 0.614 mm). The modulator 1906 used has a similar area with circular shape. With regard to high angle optics, the modulator 1906 exhibits excellent performance despite the fact that the objective 1919 has NA~0.42.

On the electronic side, a field programmable gate array (FPGA) was used to generate and control the modulation frequency signals used to drive the light source 1904 and the modulator 1906. The quadrature modulation signals were generated internally by a Spartan VI FPGA board from Xilinix. To generate the quadrature clocks, an IP core provided by Xilinix was used to generate a Digital Clock Manager (DCM). The DCM can take an input signal and generate 4 outputs each phase shifted by 0, 90, 180, 270 degrees respectively. The outputs of the DCM were fed into a 4 to 1 digital multiplexer (also programmed within the FPGA). A C++ program was used to read out frames from the camera 1908 and to synchronize the quad signal switching trigger from the computer. The algorithm used to capture the quads had two steps: In the quad acquisition stage, each quad is captured several times and averaged to improve its signal to noise ratio (SNR). In depth acquisition stage, four averaged quads are captured to produce depth information. Taking several depth images and average them, improves SNR further.

The output of the FPGA was fed to a voltage amplifier (TI THS3001CD). The output of the voltage amplifier was fed through a bias-tee to apply a −50 volt bias. Finally the modulation signal was sent to the modulator 1906 contact pad through a specialized RF probe. In addition to providing the modulation signal to the optical modulator 1906, the FPGA in the setup also provides the modulation signal to the light source 1904. The zero degree phase shifted clock signal was fed out from the FPGA to the light source 1904 (a 5 mw DFB 1550 nm laser diode). The output of the laser was fed through a single mode 1550 fiber to an erbium doped fiber amplifier (EDFA). The output of the EDFA was fed through a fiber to a stand where the signal was free to expand into free space and illuminate the scene 1902. To reduce the effect of speckle noise in the images a rotating diffuser 1905 was placed at the output of the fiber holder.

To characterize the performance of the modulator, an alternative setup was built that replaces the SWIR camera 1908 of FIG. 19 with a collimator that collects light into a multi-mode fiber. In this situation, rather than illuminating the scene 1902, the signal was directly provided by injecting a collimated beam from the output of a tunable laser source. The laser signal was reflected by the beam splitter 1918 into the modulator 1906. The modulated signal was recollected once again by the microscope objective 1919 and then coupled into the multi-mode fiber to be measured by a PIN photodiode. In low frequency mode, the signal from the PIN detector was amplified through a low noise amplifier (LNA, SR570) as it is a dc coupled amplifier, whereas in high frequency mode, a voltage amplifier (DUPVA-1-70). The signal was measured on a 2.5 GHz oscilloscope which was being triggered optically at the chosen zero degree phase shifted modulation signal (either 50 MHz, 100 MHz, or 150 MHz) by another laser diode being driven by the FPGA and measured by a PIN detector. This configuration allowed a reduction of cross talk between the modulation and the trigger signal while directly measuring the phase shift of the signal with respect to the base clock of the DCM.

Next, the measured system parameters are discussed. Two important parameters are modulation and demodulation depth (DoM) at illumination and modulator sides. In this type of measurement, both dc and ac levels of the signal need to be preserved. Since the LNA is a dc coupled amplifier, the low frequency (10 kHz) modulator's performance was first measured using the LNA, and its ac component was compared with the ac component of the high frequency (range of MHz) modulator's performance that is measured by the DUPVA. Table 1 shows the results of this measurement and the extracted DoM for different high frequencies. Note that the voltage swing at the second column gives the output of the voltage amplifier. In low frequency measurement, same voltage swing was applied to have a correct comparison.

TABLE 1

Measured System Parameters.

|  | DoM | DUPVA | DUPVA (10 kHz) | LNA (10 kHz) | DoM (10 kHz) | Swing Voltage |
|---|---|---|---|---|---|---|
| 50 MHz | 40% | 88 mV, −115 mV | 100 mV, −130 mV | 1.05 V, 1.93 V | 45% | 8.20 V, −9.00 V |

TABLE 1-continued

Measured System Parameters.

|  | DoM | DUPVA | DUPVA (10 kHz) | LNA (10 kHz) | DoM (10 kHz) | Swing Voltage |
|---|---|---|---|---|---|---|
| 100 MHz | 21% | 48 mV, −56 mV | 53 mV, −65 mV | 1.30 V, 1.72 V | 24% | 4.50 V, −5.40 V |
| 150 MHz | 15% | 36 mV, −39 mV | 48 mV, −54 mV | 2.09 V, 2.60 V | 20% | 3.20 V, −4.25 V |

Figure 20A:
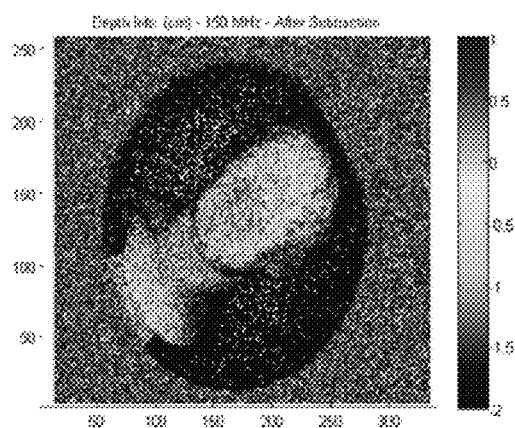
FIGS. 20A-C show depth measurement results (corrected by calibration data) for different modulation frequencies 150 MHz (A), 100 MHz (B), 50 MHz (C) obtained using the TOF depth imaging system of FIG. 19.
Figure 20B:
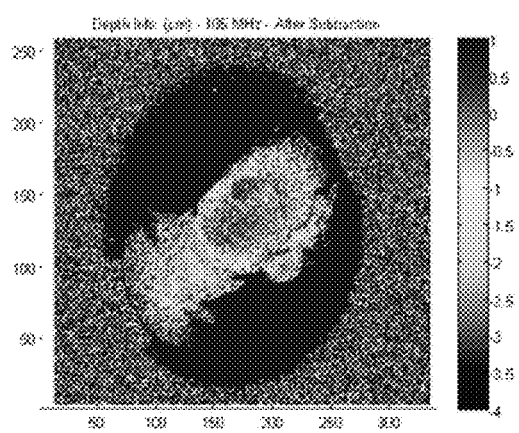
Figure 20C:
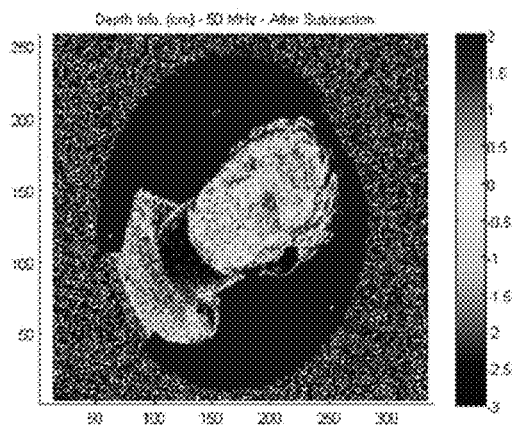

3D measurement results for different modulation frequencies were also obtained. The statue (the scene 1902) was placed 1.5 m away from the system 1900. Depth measurements of a flat homogeneous Lambertian object facing toward the system 1900 were obtained at 150 MHz, 100 MHz and 50 MHz. The depth map across the object was not constant despite the flatness of the object. Therefore, any subsequent general object has to be corrected using this calibrating data. FIGS. 20A-C show the depth measurements at 150 MHz (A), 100 MHz (B) and 50 MHz (C) of the statue after correction using the calibrating data. The images were derived by taking 6 images and averaging per quad measurement and 100 averages per depth measurement. The camera's 1908 integration time was set at 150 msec with high gain mode.

Figure 21A:
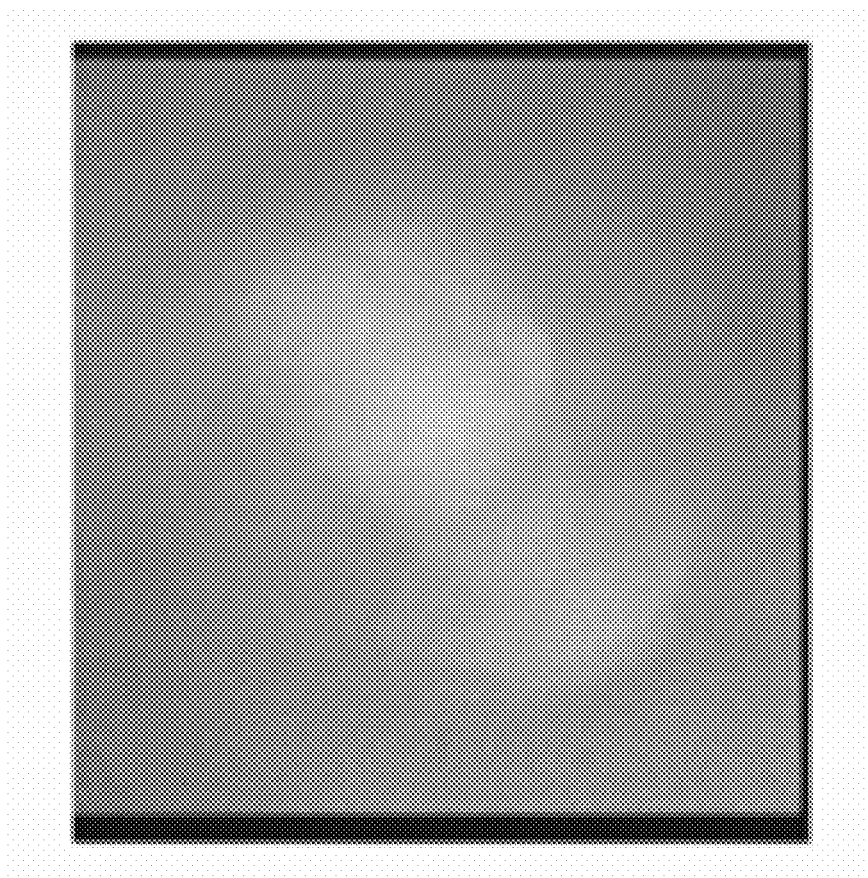
FIG. 21A shows the short-wave infrared (SWIR) image taken by the SWIR camera of the TOF depth imaging system of FIG. 19.
Figure 21B:
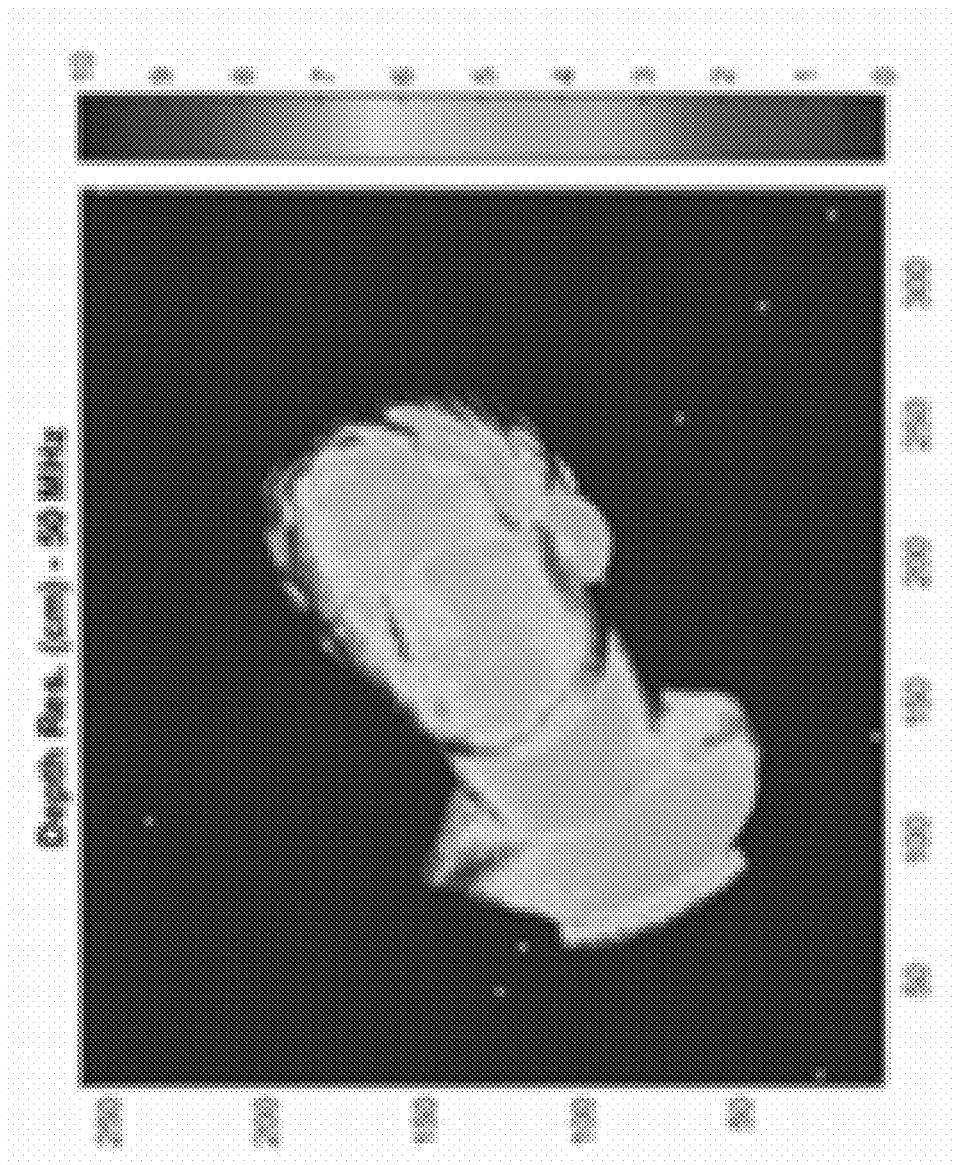
FIGS. 21B-D show the depth resolution of the TOF depth imaging system of FIG. 19 at different modulation frequencies 150 MHz (D), 100 MHz (C), 50 MHz (B).
Figure 21C:
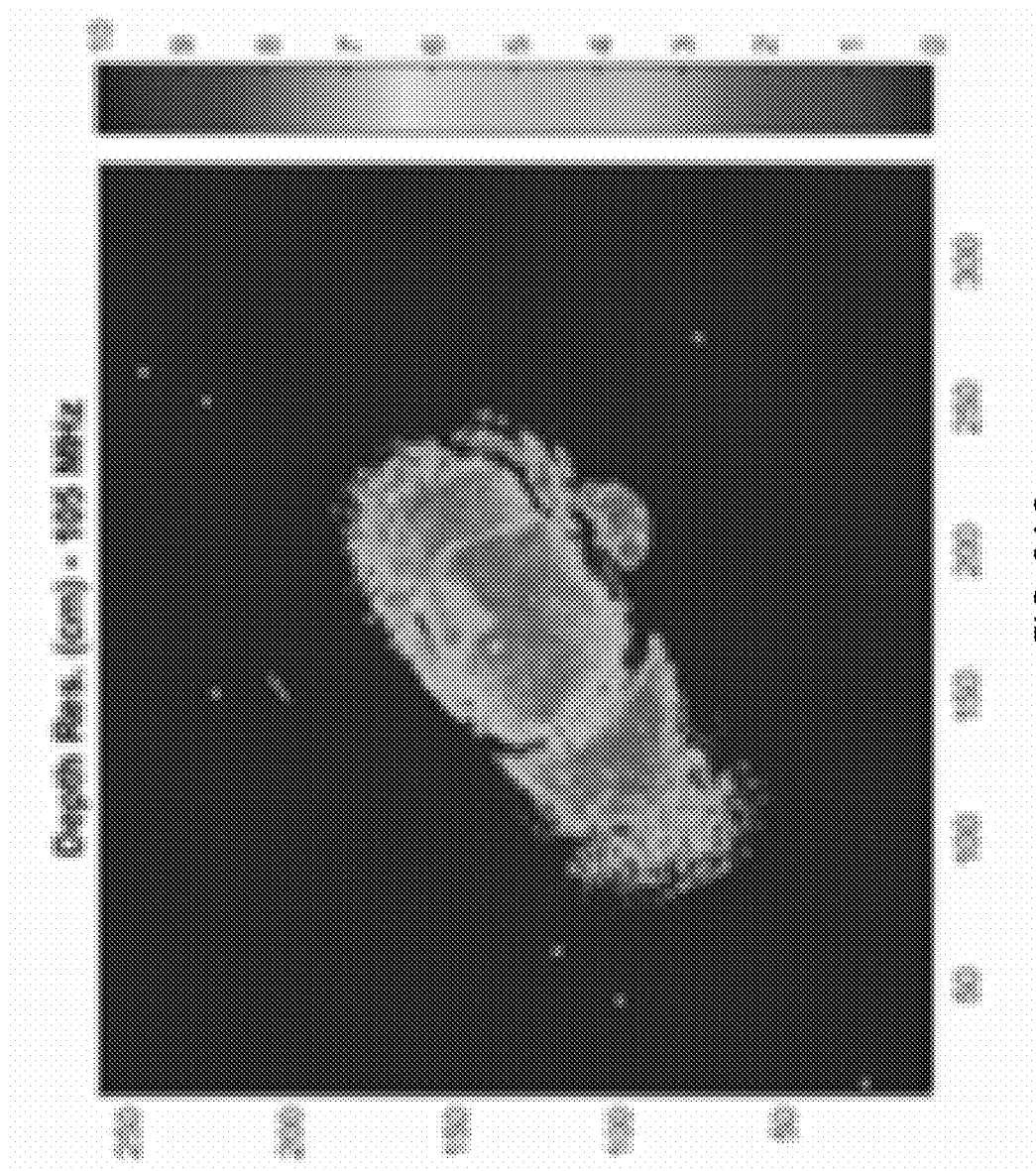
Figure 21D:
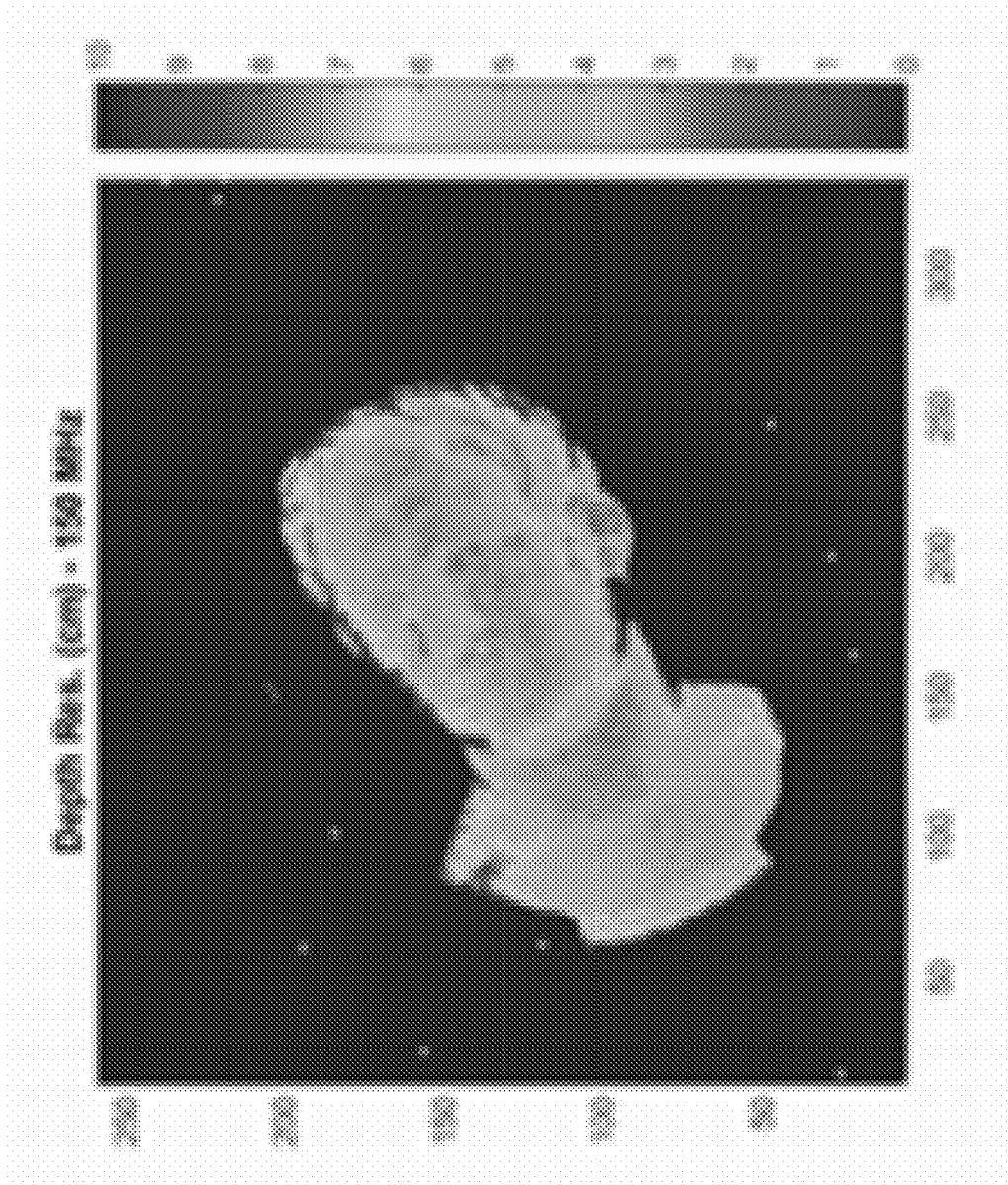

FIG. 21A shows the SWIR image of the statute taken by the camera 1908. FIGS. 21B-D compare the depth resolution for different frequencies. To get depth resolution, the standard deviation of the whole measurement was calculated to get rms of depth data. Note that the values are assigned for a single depth measurement with 6 times averaging per quad. Taking 100 times averaging per depth measurement, the data in FIGS. 20A-C has rms 10 times smaller than what is shown in FIGS. 21B-D.

Figure 22:
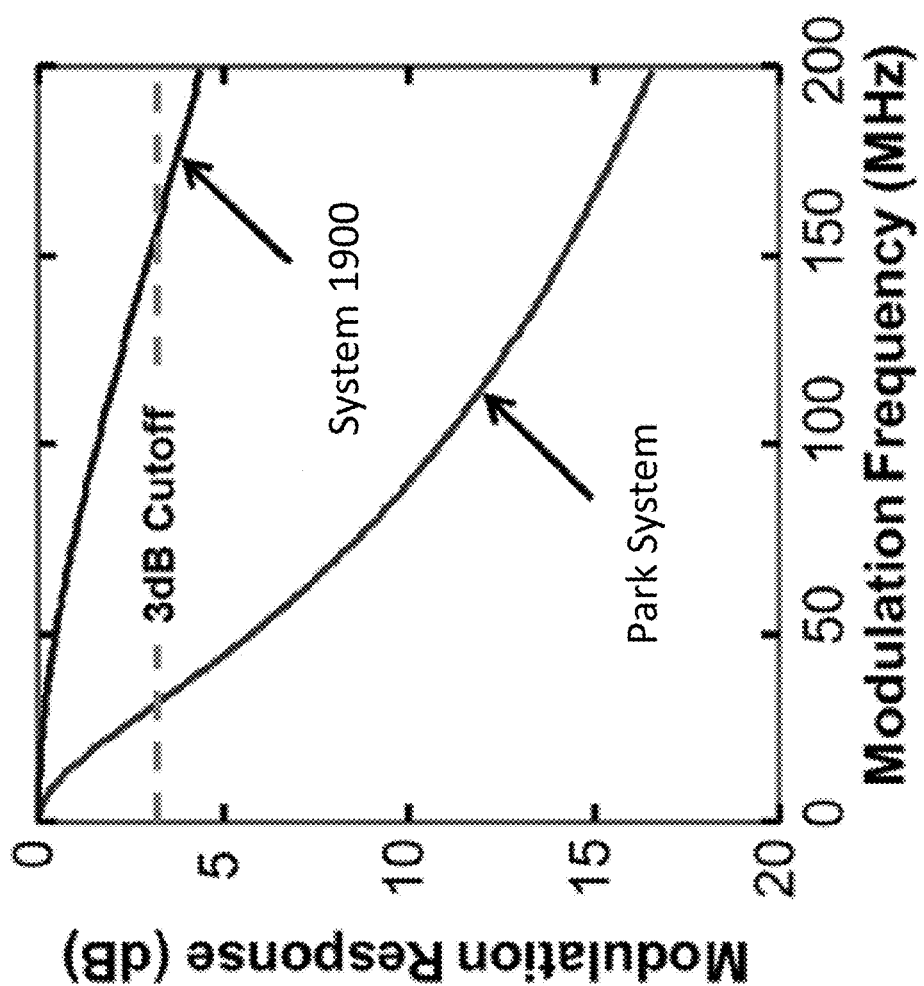
FIG. 22 shows the modulation response of the TOF depth imaging system of FIG. 19 to the system of Park as a function of modulation frequency.

FIG. 22 compares the modulation response of the system 1900 to the system of Park as a function of modulation frequency, demonstrating the superiority of the performance of the system 1900 and the approach to TOF depth imaging disclosed herein.

In conclusion, the first SWIR 3D camera with 150 MHz modulation frequency has been demonstrated. The system can incorporate any commercial SWIR camera. This system has the benefit of allowing decoupling demodulation from image capturing, resulting in very high frequency modulation. This system may be used in many SWIR applications such as night vision and disturbed atmosphere.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A TOF depth imaging system for providing a depth image of an object, the system comprising:
    a light source configured to illuminate an object with amplitude modulated light characterized by a wavelength λ and a modulation frequency f,
    a surface-normal electroabsorption modulator configured to receive and to modulate reflected light from the object with the modulation frequency f, the electroabsorption modulator comprising
    a top doped layer of semiconductor,
    a bottom doped layer of semiconductor having opposite polarity to the top doped layer, and
    an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior, wherein the electroabsorption modulator does not comprise an optical cavity; and
    an image sensor configured to receive and to detect modulated reflected light from the electroabsorption modulator.

2. The TOF depth imaging system of claim 1, further comprising a first driver in electrical communication with the light source, a second driver in electrical communication with the electroabsorption modulator, and a timing controller in electrical communication with the first and second drivers and the image sensor.

3. The TOF depth imaging system of claim 1, wherein the active layer is configured to absorb light having a wavelength in the near-infrared region of the electromagnetic spectrum.

4. The TOF depth imaging system of claim 3, wherein the multiple sublayers of semiconductor are composed of group III/V alloys.

5. The TOF depth imaging system of claim 1, wherein the active layer is configured to absorb light having a wavelength in the short-wave infrared region of the electromagnetic spectrum.

6. The TOF depth imaging system of claim 5, wherein the multiple sublayers of semiconductor comprise a multilayer structure of InGaAs/InGaAsP/InGaAsP/InGaAs or a multilayer structure of InAlAs/InGaAsP/InAlAs/InGaAs/InP.

7. The TOF depth imaging system of claim 1, wherein the active layer is configured to absorb light having a wavelength in the mid-wave and long-wave infrared region of the electromagnetic spectrum and further wherein the multiple sublayers of semiconductor comprise a multilayer structure of InGaAsSb/InGaSb lattice matched to a GaSb substrate, or strain balanced to a GaSb substrate.

8. The TOF depth imaging system of claim 1, wherein the active layer is configured to absorb light having a wavelength in the ultraviolet region of the electromagnetic spectrum and further wherein the multiple sublayers of semiconductor comprise a multilayer structure of InGaN/GaN/AlGaInN.

9. The TOF depth imaging system of claim 1, wherein the active layer comprises stepped quantum wells composed of at least two quantum well sublayers of semiconductor, the at least two quantum well sublayers having different compositions.

10. The TOF depth imaging system of claim 9, wherein the stepped quantum wells are two-step stepped quantum wells.

11. The TOF depth imaging system of claim 10, wherein the two-step stepped quantum wells are composed of a first GaAs quantum well sublayer and a second $Al_xGa_{1-x}As$ quantum well sublayer and the barriers are composed of $Al_xGa_{1-x}As$ barriers.

12. The TOF depth imaging system of claim 1, wherein the active layer comprises quantum wells having a type-II heterojunction.

13. The TOF depth imaging system of claim 1, wherein the active layer comprises square quantum wells composed of a single layer of semiconductor and the TOF depth imaging system further comprises a voltage source configured to apply a delocalizing constant voltage to the electroabsorption modulator to achieve a delocalizing constant electric field.

14. The TOF depth imaging system of claim 1, wherein the active layer has an overall thickness L and the overall thickness L is that which provides a minimum depth resolution coefficient K of the electroabsorption modulator.

15. The TOF depth imaging system of claim 14, wherein the overall thickness L of the active layer is greater than a value at which value the depth resolution coefficient K would be minimized if the active layer did not comprise quantum wells configured to exhibit delocalized electron-hole behavior.

16. The TOF depth imaging system of claim 1, wherein the active layer has an overall thickness L and the overall thickness L is in the range of from 1 μm to 20 μm.

17. The TOF depth imaging system of claim 1, wherein the electroabsorption modulator is configured as a single-pass electroabsorption modulator.

18. The TOF depth imaging system of claim 1, wherein the electroabsorption modulator is configured as a double-pass electroabsorption modulator.

19. The TOF depth imaging system of claim 1, wherein the electroabsorption modulator is characterized by a first area and the image sensor is characterized by a second area, and further wherein the ratio of the first area to the second area is less than 1.

20. The TOF depth imaging system of claim 1, further comprising a short-wave-infrared camera, wherein the image sensor is a component of the short-wave-infrared camera.

21. The TOF depth imaging system of claim 1, wherein the modulation frequency f is at least 50 MHz.

22. A method of TOF depth imaging comprising:
illuminating an object with amplitude modulated light characterized by a wavelength λ and a modulation frequency f to generate reflected light from the object;
modulating the reflected light from the object using a surface-normal electroabsorption modulator to generate modulated reflected light, the electroabsorption modulator comprising
a top doped layer of semiconductor,
a bottom doped layer of semiconductor having opposite polarity to the top doped layer, and
an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior, wherein the electroabsorption modulator does not comprise an optical cavity; and
detecting the modulated reflected light from the electroabsorption modulator via an image sensor.

23. A TOF depth imaging system for providing a depth image of an object, the system comprising:
a light source configured to illuminate an object with amplitude modulated light characterized by a wavelength λ and a modulation frequency f,
a surface-normal electroabsorption modulator configured to receive and to modulate reflected light from the object with the modulation frequency f, the electroabsorption modulator comprising
a top doped layer of semiconductor,
a bottom doped layer of semiconductor having opposite polarity to the top doped layer, and
an active layer between the top and bottom doped layers, the active layer configured as a superlattice structure comprising multiple sublayers of semiconductor configured to provide alternating quantum wells and barriers, the active layer comprising quantum wells configured to exhibit delocalized electron-hole behavior, wherein the active layer has an overall thickness L and the overall thickness L is in the range of from 1 μm to 20 μm; and
an image sensor configured to receive and to detect modulated reflected light from the electroabsorption modulator.

24. A method of TOF depth imaging using the TOF depth imaging system of claim 23, the method comprising:
illuminating an object with the amplitude modulated light from the light source characterized by the wavelength λ and the modulation frequency f to generate reflected light from the object;
modulating the reflected light from the object using the electroabsorption modulator to generate modulated reflected light; and
detecting the modulated reflected light from the electroabsorption modulator via the image sensor.

* * * * *